US010716260B2

(12) United States Patent
Robertson

(10) Patent No.: US 10,716,260 B2
(45) Date of Patent: Jul. 21, 2020

(54) COMBINE HARVESTER CONCAVE BAR AND SEPARATOR GRATE

(71) Applicant: Brian G. Robertson, Dallas, TX (US)

(72) Inventor: Brian G. Robertson, Dallas, TX (US)

( * ) Notice: Subject to any disclaimer, the term of this patent is extended or adjusted under 35 U.S.C. 154(b) by 80 days.

(21) Appl. No.: 15/856,381

(22) Filed: Dec. 28, 2017

(65) Prior Publication Data

US 2019/0200529 A1 Jul. 4, 2019

(51) Int. Cl.
*A01F 12/26* (2006.01)

(52) U.S. Cl.
CPC .................................... *A01F 12/26* (2013.01)

(58) Field of Classification Search
CPC .......... A01F 12/26; A01F 12/20; A01F 12/22; A01F 7/067
See application file for complete search history.

(56) References Cited

U.S. PATENT DOCUMENTS

| | | | | |
|---|---|---|---|---|
| 952,795 A | | 3/1910 | Flynn | |
| 1,778,664 A | * | 10/1930 | Dragon | F23H 17/12 126/152 R |
| 2,305,964 A | | 12/1942 | Harrison et al. | |
| 2,457,680 A | * | 12/1948 | Johnson | A01F 12/24 241/DIG. 30 |
| 2,937,647 A | | 5/1960 | Allen et al. | |
| 3,983,883 A | | 10/1976 | Ashton et al. | |
| 4,353,376 A | | 10/1982 | Schuler | |
| 4,875,891 A | | 10/1989 | Turner et al. | |
| 5,024,631 A | * | 6/1991 | Heidjann | A01F 12/26 460/109 |
| 5,569,080 A | | 10/1996 | Estes | |

(Continued)

FOREIGN PATENT DOCUMENTS

| | | |
|---|---|---|
| CA | 2297624 A1 | 1/2001 |
| KR | 20040012630 A | 2/2004 |
| WO | WO0124609 A1 | 4/2001 |

OTHER PUBLICATIONS

PCT/US2018/067237 International Search Report and Written Opinion, dated Mar. 22, 2019, 12 pages total.

(Continued)

*Primary Examiner* — Thomas B Will
*Assistant Examiner* — Joan D Misa
(74) *Attorney, Agent, or Firm* — Law Office of Sam Sokhansanj PLLC

(57) ABSTRACT

A concave grate, concave bar, or concave rod assembly and configuration for threshing operations of a combine harvester is disclosed having concave bars or rods configured at various angles and positions such that they maximize threshing throughput. T concave bar assembly can include an elongated bar having a semi-cylindrical or partially round configuration. Further, the elongated bar can include a partial cut-out, notch, or channel longitudinally extending the length of the elongated bar, and wherein the elongated bar can be configured to be secured to a concave of the combine harvester. Here, the partial cut-out, notch, or channel further can include a first sloped or raised surface. Further, the first sloped or raised surface can be configured to make contact with one or more grains of a crop material, thereby effectively and efficiently separating the the one or more grains from the crop material.

25 Claims, 18 Drawing Sheets

(56) References Cited

U.S. PATENT DOCUMENTS

| | | | | |
|---|---|---|---|---|
| 6,193,604 | B1 | 2/2001 | Ramp et al. | |
| 6,537,148 | B2 | 3/2003 | Schwersmann | |
| 6,958,012 | B2 | 10/2005 | Duquesne et al. | |
| 7,166,026 | B2 | 1/2007 | Ricketts et al. | |
| 7,207,882 | B2 | 4/2007 | Schmidt et al. | |
| 7,285,043 | B2 | 10/2007 | Foster et al. | |
| 8,313,361 | B2 | 11/2012 | Flickinger et al. | |
| 8,454,416 | B1 * | 6/2013 | Estes | A01F 12/24 460/107 |
| 8,636,568 | B1 * | 1/2014 | Farley | A01F 12/26 460/68 |
| 8,690,652 | B1 | 4/2014 | Estes | |
| 8,721,411 | B2 | 5/2014 | Reiger et al. | |
| 9,215,845 | B2 | 12/2015 | Regier | |
| 9,504,204 | B2 * | 11/2016 | Kile | A01D 41/12 |
| RE46,401 | E | 5/2017 | Estes | |
| 9,723,791 | B1 * | 8/2017 | Kile | A01F 12/24 |
| 10,045,487 | B1 * | 8/2018 | Robertson | A01F 12/24 |
| 2005/0197176 | A1 | 9/2005 | Foster et al. | |
| 2006/0128451 | A1 | 6/2006 | Ricketts et al. | |
| 2010/0267433 | A1 | 10/2010 | Flickinger et al. | |
| 2011/0143827 | A1 | 6/2011 | Flickinger et al. | |
| 2011/0151951 | A1 | 6/2011 | Regier et al. | |
| 2015/0250101 | A1 | 9/2015 | Kile | |
| 2016/0353662 | A1 | 12/2016 | Haus et al. | |
| 2017/0347529 | A1 | 12/2017 | Bussman et al. | |
| 2018/0368325 | A1 | 12/2018 | Koudela | |

OTHER PUBLICATIONS

PCT/US2018/067245 International Search Report and Written Opinion, dated Mar. 25, 2019, 44 pages total.

PCT/US2018/067256 International Search Report and Written Opinion, dated Mar. 22, 2019, 39 pages total.

PCT/US2018/067262 International Search Report and Written Opinion, dated Apr. 2, 2019.

Peter Miu, "Combine Harvesters Theory, Modeling, and Design," 2016, CRC Press, 485 pp. total.

* cited by examiner

COMBINE HARVESTER CONCAVE BAR AND SEPARATOR GRATE

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

A combine harvester is a machine that is used to harvest grain crops. The objective is to complete several processes, which traditionally were distinct, in one pass of the machine over a particular part of the field. Among the crops that may be harvested with a combine can include but is not limited to wheat, oats, rye, barley, corn, soybeans, and flax or linseed. The waste (e.g., straw) left behind on the field includes the remaining dried stems and leaves of the crop having limited nutrients which may be, for example, chopped and spread on the field or baled for feed and bedding for livestock. Generally, the combine harvester includes a header, which removes the crop from a field, and a feeder housing which transports the crop matter into a threshing rotor. The threshing rotor can include one or more rotors which can extend axially (front to rear) or transversely within the body of the combine, and which are partially or fully surrounded by one or more perforated concaves. In particular, the there may be a rotor having concave bars and grates for threshing operations of the crop, and another concave grate having fingers for separation operations of the crop material, also known as separation concaves or separation grates. Generally, the separation grate is meant to separate any grain that is caught in material other than grain, such as chaff, shucks, stalk, leafy material, among others, which may also be referred to herein as MOG.

Here, the concave and separator grate assemblies can be arranged side-by-side axially along the processing system of a combine harvester. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue can be discharged through the concaves and fall onto a grain pan where they are transported to a cleaning system.

However, current conventional concave bars and separation grates have certain configurations that are not optimized to maximize threshing and separating of the crop material, thereby resulting in inefficient harvesting and wasted crop. In one example of conventional combine concaves, if a combine harvester has three concaves, then a crop that is threshed in a first concave can still be threshed by the other two concaves behind it, or a ⅔ probability for the crop grains to fall through the concave openings before it is discharged to the back and out of the combine. However, if the crop does not get threshed until the second concave, then it has a ⅓ probability for it to be threshed before it reaches the third concave. Further, if the crop is not threshed in the second concave, then the third concave can become overloaded with crop and grain material and operating at over capacity, thus resulting in the grain being discharged out the back of the combine and resulting in very inefficient harvesting.

What is needed is a concave bar configuration that is optimized to certain threshing angles for its bars to maximize a threshing surface area of crop material and minimize the time needed to thresh the crop, such that seed or grain has more efficient and quickly fall through the openings of the concave, thereby minimizing or eliminating wasted crop material, among others. What is also needed is a more efficient separation grate that provides full separation of the grain, maximizes separation capacity of the combine, and more effective agitation of the crop and grain material, thereby maximizing harvesting efficiency, among others.

BRIEF SUMMARY

In one aspect of the disclosure described herein, a concave grate, concave bar, or concave rod assembly and configuration for threshing operations of a combine harvester is disclosed having concave bars or rods configured at various angles and positions such that they maximize threshing throughput, have increased longevity from case hardening and hard surfacing, provide more threshing surface area for hard to thresh smaller grains, leafy crops, or high moisture crops, in addition to capturing more crop for threshing, increasing harvest yields, reducing time in changing out concaves on the field, faster threshing that increases combine capacity, and having hardened steel rod components with an extended life cycle, among other advantages.

In another aspect of the disclosure described herein, an apparatus is disclosed for separating grain in a combine harvester. Here, the apparatus can include an elongated bar having a semi-cylindrical or partially round configuration. Further, the elongated bar can include a partial cut-out, notch, or channel longitudinally extending the length of the elongated bar, and wherein the elongated bar can be configured to be secured to a concave of the combine harvester. Here, the partial cutout, notch, or channel further can include a first sloped or raised surface. Further, the first sloped or raised surface can be configured to make contact with one or more grains of a crop material, thereby separating the the one or more grains from the crop material. The sloped or raised surface can include a 20 degree angle relative to a horizontal plane. In addition, the sloped or raised surface can include a 25 degree angle relative to a horizontal plane. The sloped or raised surface can also include a 30 degree angle relative to a horizontal plane. The sloped or raised surface can also include a 35 degree angle relative to a horizontal plane. The the sloped or raised surface can also include further comprised of a 40 degree angle relative to a horizontal plane. Further, the sloped or raised surface can also include a 45 degree angle relative to a horizontal plane. The sloped or raised surface can also include a 50 degree angle relative to a horizontal plane. The sloped or raised surface can include a 65 degree angle relative to a horizontal plane. The sloped or raised surface can include a 90 degree angle relative to a horizontal plane. The apparatus may also include a first raised surface and a second raised surface, wherein the first raised surface is at an angle relative to a horizontal plane that is more or less than the second raised surface. Here, the first raised surface can include a 30 degree angle, and the second raised surface can include a 45 degree angle relative to a horizontal plane.

In another aspect of the disclosure described herein, an apparatus is disclosed for separating grain in a combine harvester. Here, the apparatus can include an elongated bar.

The elongated bar can further include a partial cut-out, notch, or channel longitudinally extending the length of the elongated bar. Here, the partial cut-out, notch, or channel can include a first surface and a second surface configured to make contact and with one or more grains of a crop material, wherein the first surface is a first raised angle or elevation relative to the second surface, and wherein the elongated bar is configured to be secured to a rotary concave of the combine harvester.

In another aspect of the disclosure described herein, a concave separator or concave separation grate assembly and configuration for separating operations of a combine harvester is disclosed having integrated, interchangeable, and removable finger-like like configurations and assortments that can allow full separation of crop material from chaff, straw, vines and the like, in addition to separating grain entrapped in the threshed crop material, increasing grain separating capacity in a combine, improved breaking up the chaff-grain material, increased agitation of the mixture of grain and chaff for separating the grain from the chaff, lifting and moving straw away from grain material, and reducing threshed grain that would otherwise be diverted or discharged out of the back of the combine, among other advantages.

In another aspect of the disclosure described herein, an apparatus is disclosed for separating grain in a combine harvester. The apparatus can include a bracket member, and a plurality of first protruding members secured to the bracket member and having a first configuration, the first protruding member having a proximal end and a distal end. The protruding members can include an elevation or angled relative to a horizontal plane when secured to the bracket member, and wherein each of the plurality of first protruding members can be equally spaced apart from each other when secured the bracket member. Here, the proximal end of the first protruding members can be slightly larger in width or diameter relative to the distal end. Further, the first configuration of the first protruding members can further include a smooth, beveled, or rounded exterior surface. In addition, the apparatus can include a plurality of second protruding members having a second configuration independent of the the first configuration of the first protruding members. Here, second protruding members can further include a lower region and an upper region, wherein the lower region is shorter in width relative to the upper region. In addition, the second protruding members can include smooth, beveled, or rounded exterior surface. The second protruding members can also be secured to the first bracket member in combination with the second protruding members. The second protruding members can also include a serrated edge configuration, wherein the serrated edge configuration can include at least two partial cut-outs thereby defining a first teeth, second teeth, and third teeth. In addition, the bracket member can also include one or more mounting regions, configured to be mounted to a concave of a combine harvester.

In another aspect of the disclosure described herein, an apparatus for separating grain in a combine harvester is disclosed. The apparatus can include a bracket member, and a plurality of first protruding members secured to the bracket member and having a first configuration, the first protruding member having a proximal end and a distal end. Here, the protruding members can further include an elevation or angled relative to a horizontal plane when secured to the bracket member. In addition, wherein each of the plurality of first protruding members can be equally spaced apart from each other when secured the bracket member. Here, the protruding members can include a width of approximately 0.75 inches. Further, the protruding members can include a width of approximately 1.0 inches. The protruding members can also include a width of approximately 1.25 inches. In addition, the protruding members can include a width of approximately 1.5 inches. The apparatus can further include a plurality of second protruding members, wherein the second protruding members can include a width that is less than a width of the first protruding members. Here, the first and second protruding members can also be arranged in an alternating configuration.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1:
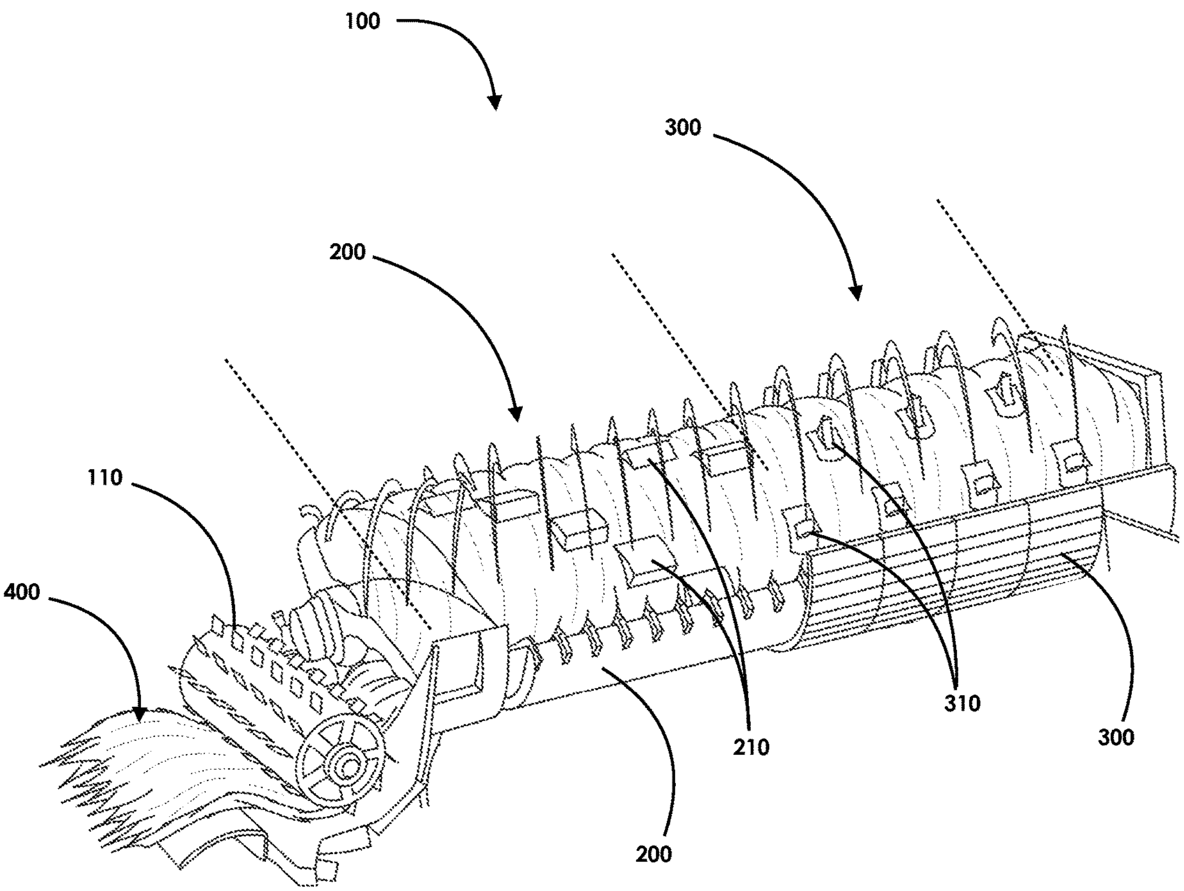
FIG. 1 illustrates a perspective view of one non-limiting embodiment of a general overview for a concave bar and separator grate assembly of the disclosure described herein for a combine harvester.

FIG. 1 illustrates a partial simplified view of a combine harvester having a concave bar and separation grate assembly of the disclosure described herein, shown in a generalized and overview depiction. In particular, a combine harvester 100 can include a feeder roller 110 configured to grasp and feed various crop material 400 to the concave rotors of the harvester. In addition, harvester 100 includes a helical rotor having a concave bar or rod assembly 200 for threshing the crop material 400, and wherein the helical rotor further includes a separation concave or separation grate for further separating the crop material 400 for separation operations after the threshing operations. More specifically, concave 200 and concave 300 can rotate in either a clockwise or counter-clockwise configuration causing the crop material to rotate or move in an opposing direction thereby threshing the crop and separating it from its stalk or chaff. In addition, concave 200 can include a plurality of bars or rods 210 secured longitudinally within the concavity region of concave 210 for crop threshing operations. Further, concave 300 includes a plurality of bracket members 310 secured to the interior of the concavity of concave 300, wherein each bracket member 310 can have a variety of fingers or protruding members for crop separation operations.

Concave Threshing Bar

Figure 2:
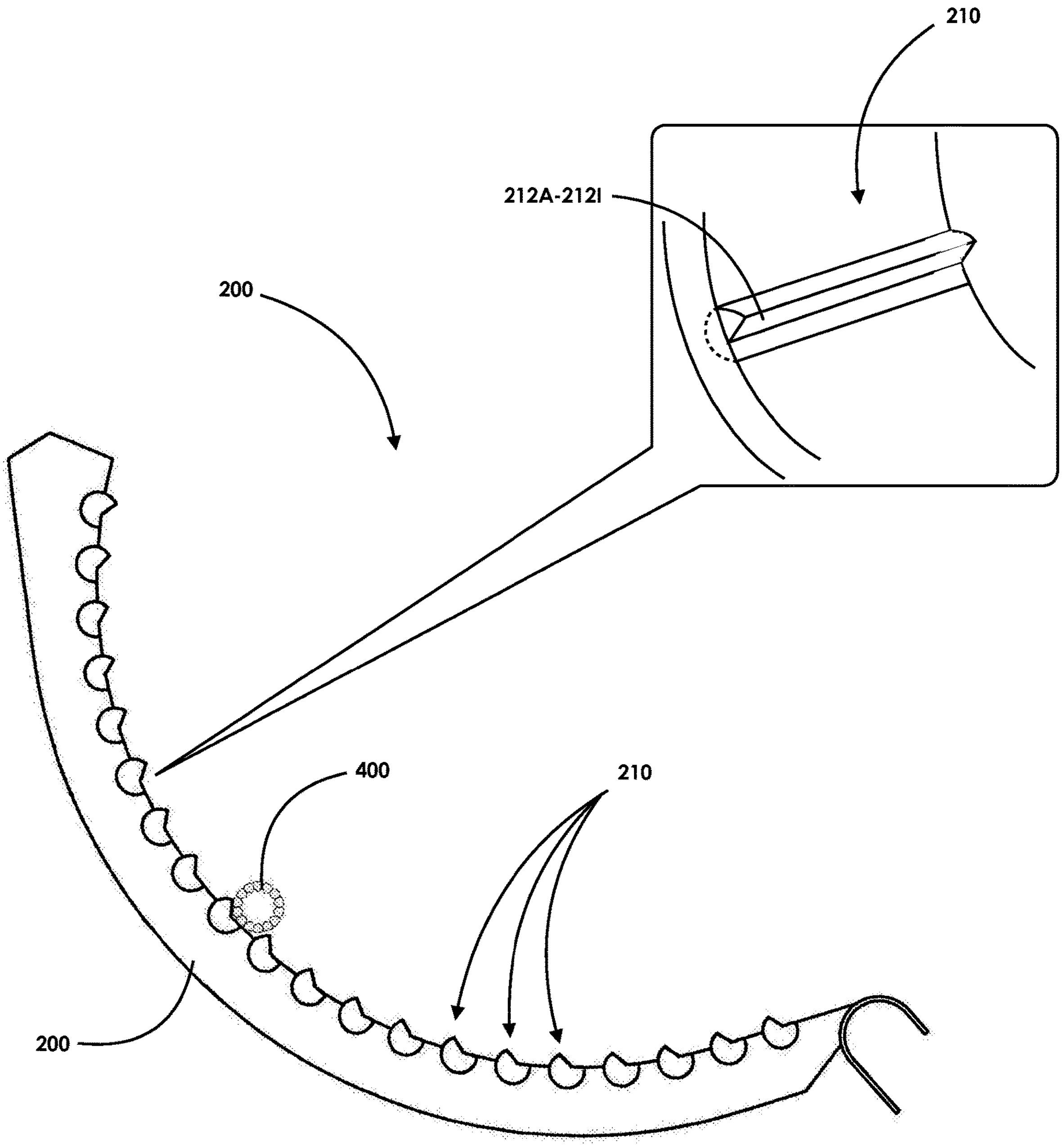
FIG. 2 illustrates a cross-sectional side view and a close-up perspective view for one non-limiting embodiment of one or more bars or rods of the concave bar assembly of the disclosure described herein.

FIG. 2 illustrates a partial cross-sectional view of the concave bar 200 of the disclosure described herein. In particular, each rod or bar 210 of concave bar extends laterally across the concave region. Alternatively, each bar 210 may also be staggered with respect to each other or not extend to the width fo the concave. In particular, as illustrated in FIGS. 3A-3K, each bar 210 has a cut-out region or wedge shape in particular angles that significantly improve the threshing surface area of the bar, depending on the type of crop material being harvested or threshed. Moreover, this is accomplished by optimizing the threshing surface angle to bars with threshing angle from 25 degrees up to 90 degrees, preferably from about 30 degrees up to and including about 45 degrees, or 30-45 degrees. Here, such threshing angles provide significantly more threshing surface area with respect to conventional concave bars, thereby improving threshing effectiveness and the time it takes to thresh crop material. In particular, through testing, it has been found that the 25 to 90 degrees angles, preferably from about 30 degrees up to and including about 45 degrees, or 30-45 degrees, can provide up to thirty (30) times more threshing surface area with respect to conventional bars. In particular, this improved threshing surface area results in the crop being completely threshed and leaving little to or un-threshed crop. For example, in one example of corn on a cob, the increased threshing surface area resulted in more force or pressure applied to each single kernel on the cob, thereby causing each single kernel to separate or detach from the cob. In addition, the angled configurations of the concave bar 210 of the disclosure described herein further allows crop to be threshed in less time, thereby allowing more time for the the grains of the threshed crop to sift through the concave.

Figure 3A:
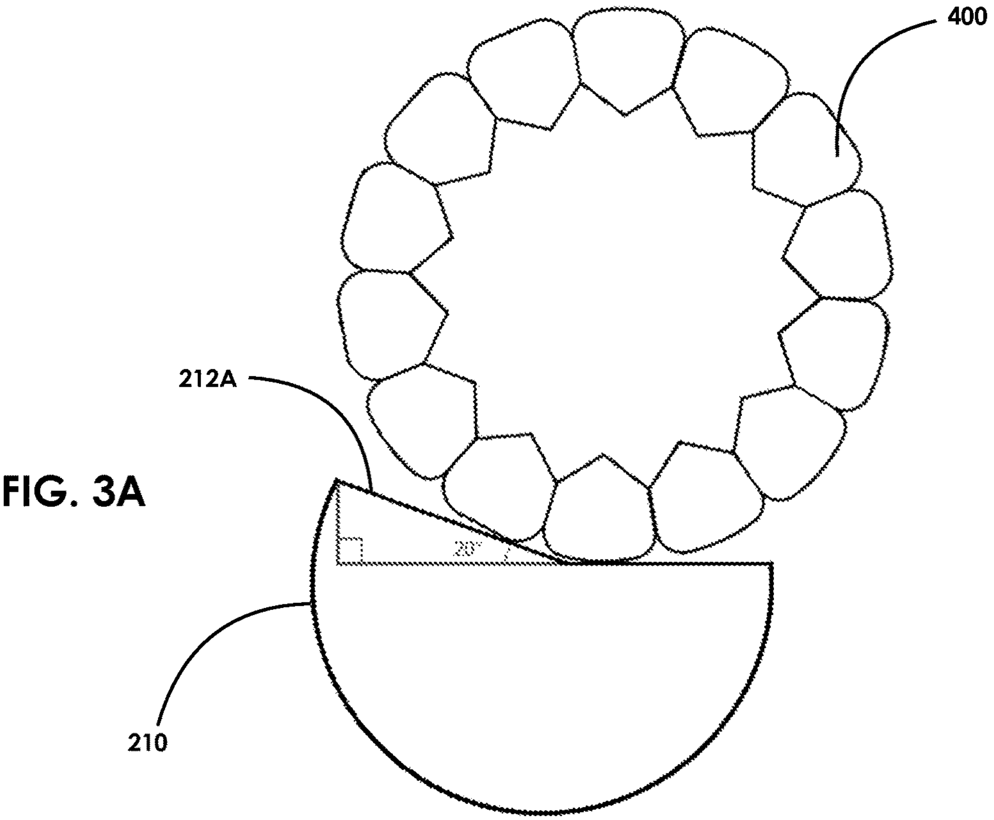
FIG. 3A illustrates a cross-sectional side view for one non-limiting embodiment of a bar having a 20 degree partial cut-out for the concave bar assembly of the disclosure described herein for crop threshing operations.
Figure 3B:
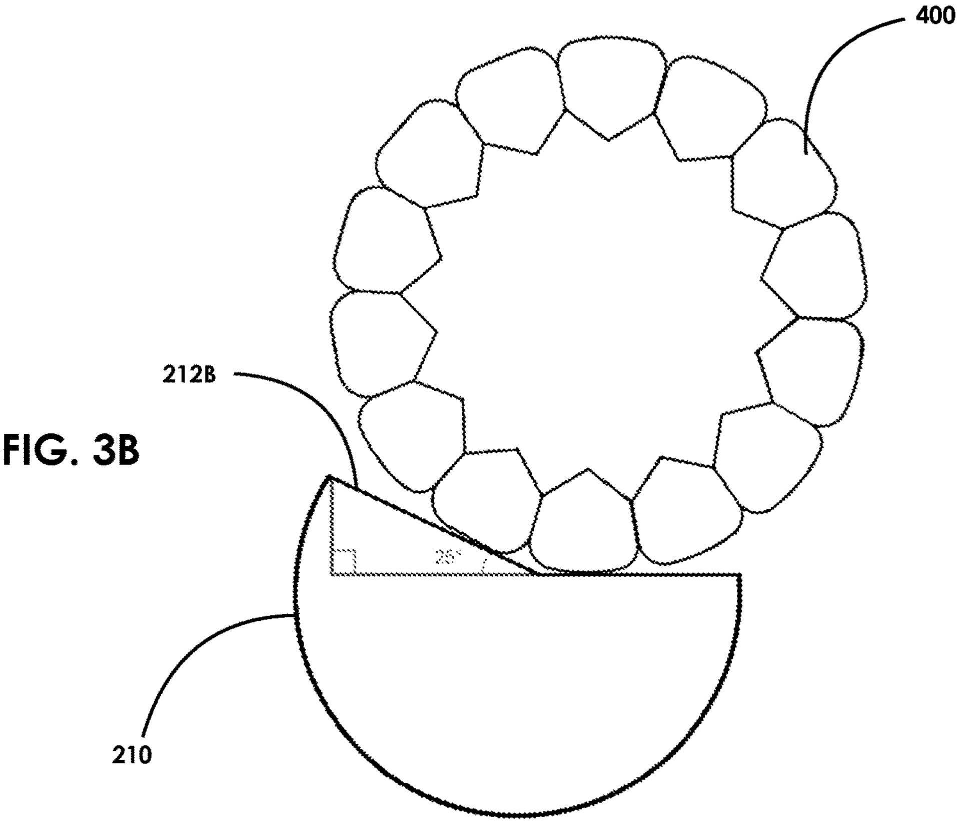
FIG. 3B illustrates a cross-sectional side view for one non-limiting embodiment of a bar having a 25 degree partial cut-out for the concave bar assembly of the disclosure described herein for crop threshing operations.
Figure 3C:
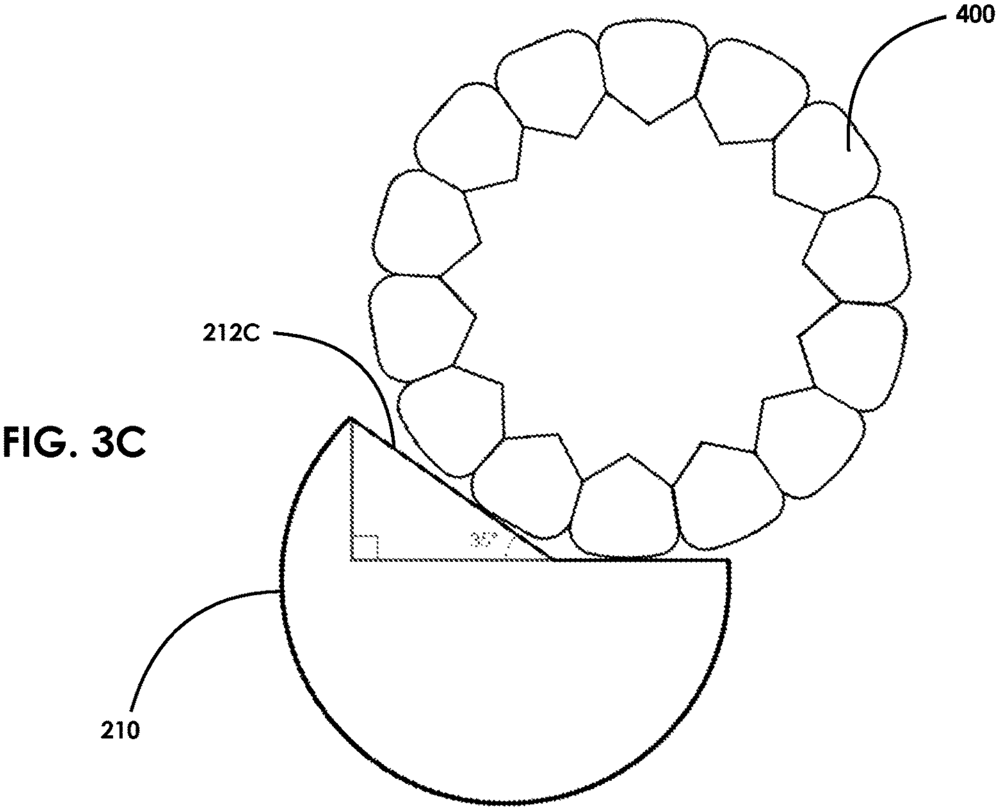
FIG. 3C illustrates a cross-sectional side view for one non-limiting embodiment of a bar having a 35 degree partial cut-out for the concave bar assembly of the disclosure described herein for crop threshing operations.
Figure 3D:
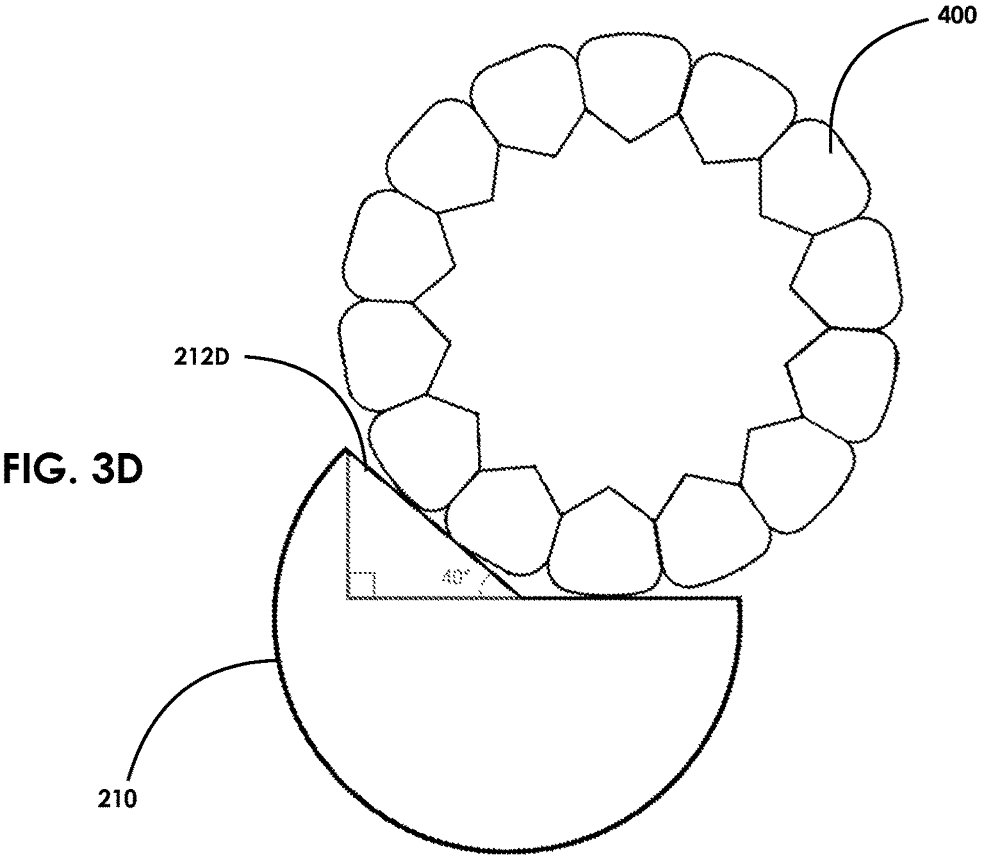
FIG. 3D illustrates a cross-sectional side view for one non-limiting embodiment of a bar having a 40 degree partial cut-out for the concave bar assembly of the disclosure described herein for crop threshing operations.
Figure 3E:
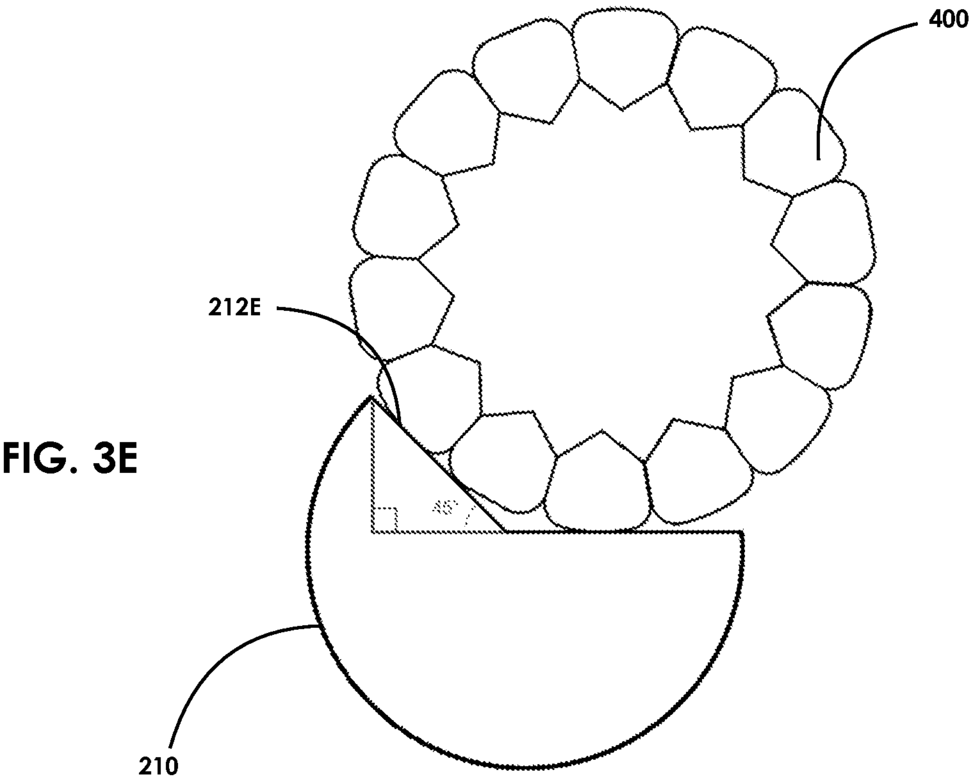
FIG. 3E illustrates a cross-sectional side view for one non-limiting embodiment of a bar having a 45 degree partial cut-out for the concave bar assembly of the disclosure described herein for crop threshing operations.
Figure 3F:
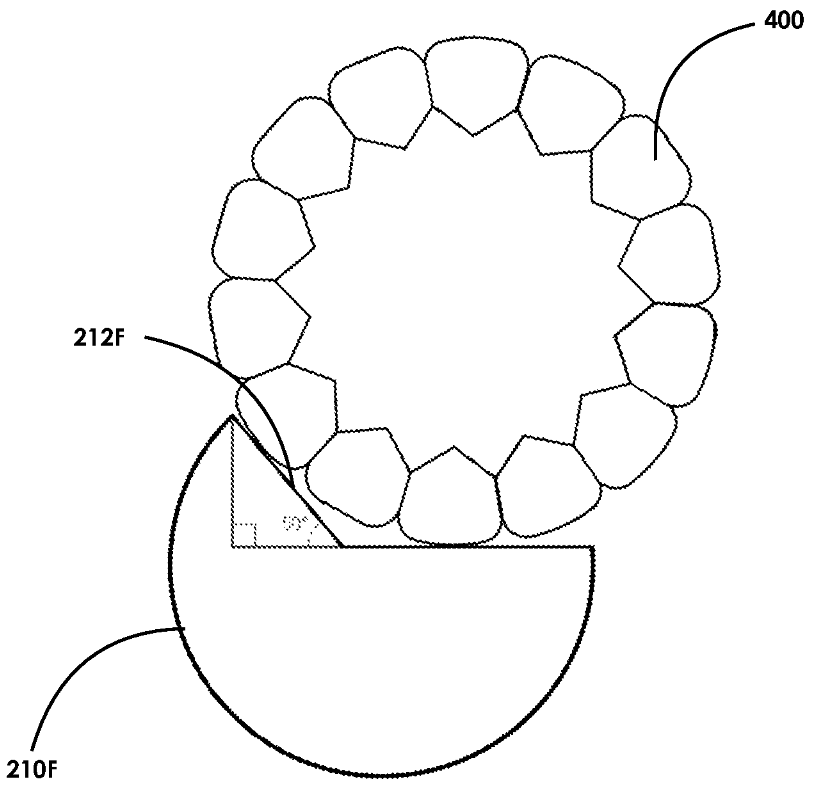
FIG. 3F illustrates a cross-sectional side view for one non-limiting embodiment of a bar having a 50 degree partial cut-out for the concave bar assembly of the disclosure described herein for crop threshing operations.
Figure 3G:
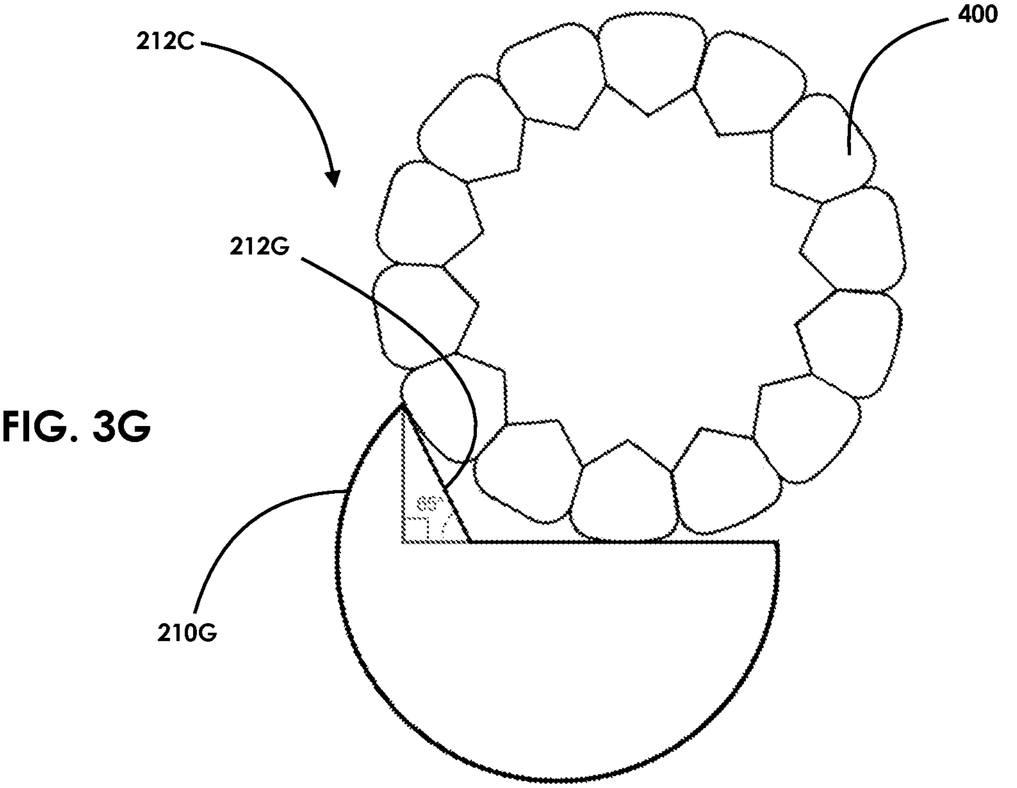
FIG. 3G illustrates a cross-sectional side view for one non-limiting embodiment of a bar having a 65 degree partial cut-out for the concave bar assembly of the disclosure described herein for crop threshing operations.
Figure 3H:
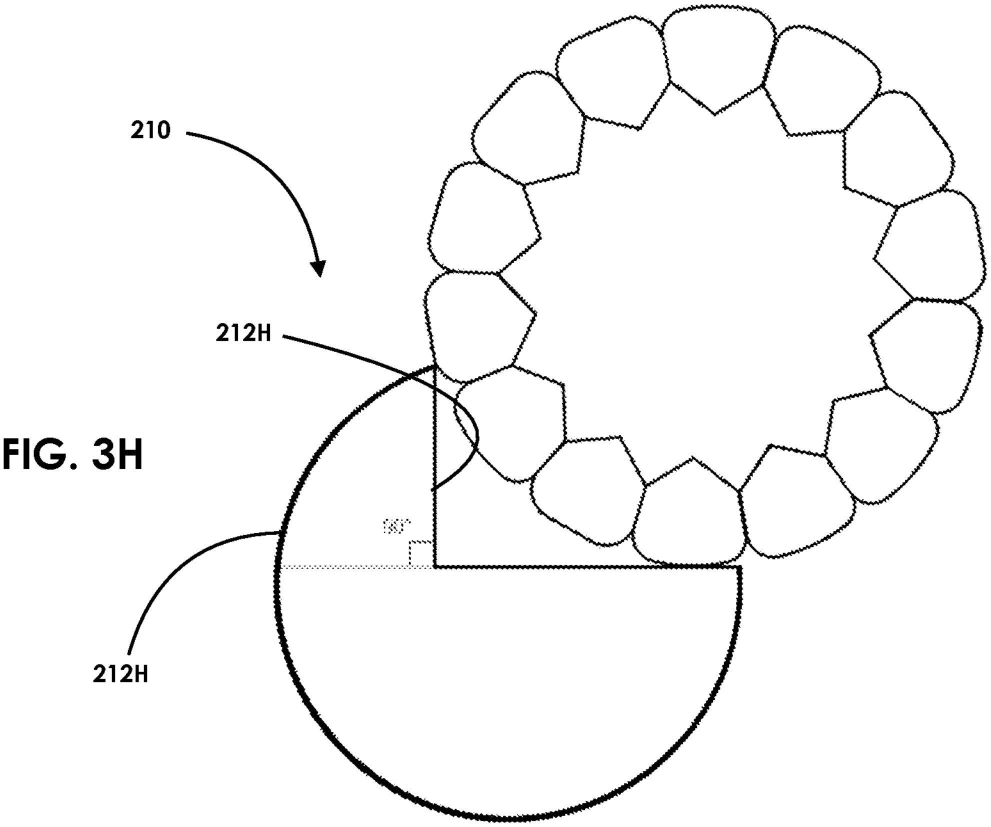
FIG. 3H illustrates a cross-sectional side view for one non-limiting embodiment of a bar having a 90 degree partial cut-out for the concave bar assembly of the disclosure described herein for crop threshing operations.

Referring to FIGS. 3A-3K various configurations for the bars 210 of concave 200 are shown with respect to crop 400, such as grain kernels on a corn cob. Here, elongated bars or rods 210 are generally comprised of a round, partially round, notched, oval, rectangular, polygonal, semi-round, semi-cylindrical configuration, or a cylindrical configuration having a cut-out, channel, groove, or notch region. More specifically, semi-cylindrical configuration can include raised surfaces 212A, 212B, 212C, 212D, 212E, 212F, 212G, 212H, 212I, 214I, 212J, 212K, and 214K that raise from an approximate center or mid-point region of bar 210. Here, the diameter of each bar 212 can be generally from 3/16 inch up to and including two (2) inches, preferably 0.75 to 1.25 inches. In addition, the raised angle, grade, or slope of surfaces 212A-212K, that can range from approximately 20 degrees up to and including 90 degrees can be configured or adapted to the type of crop being threshed, the size of the crop, the moisture level of the crop, density of the crop, and/or the amount of force required to separate a grain from the stalk or chaff of the crop. For example, an angle of 65 degrees or 90 degrees, as shown in FIGS. 3G-3H, can be more disruptive and impactful to crop 400, as opposed to an angle of 20 degrees, as shown in FIG. 3A. For example, with respect to FIGS. 3A-3D, crop 400 generally makes more contact with surfaces 212A-212D, in ascending order, before the crop reaches the top sharp edge of bar 210. In these embodiments, the 20 degree to 50 degree angles of bar 210 may be more beneficial for softer or less dense crop or grains that can more readily separate from the stalk or chaff, and also resulting in less damage to the crop. In contrast, angles 65 to 90 degrees, as shown in FIGS. 3G-3H, may be more suited for crops that may be more dense or have grains that are generally more difficult to separate from their stalk or chaff, thereby requiring crop 400 to make more contact with the sharp outer edge of bar 210 and less contact with surfaces 212G-212H.

Figure 3I:
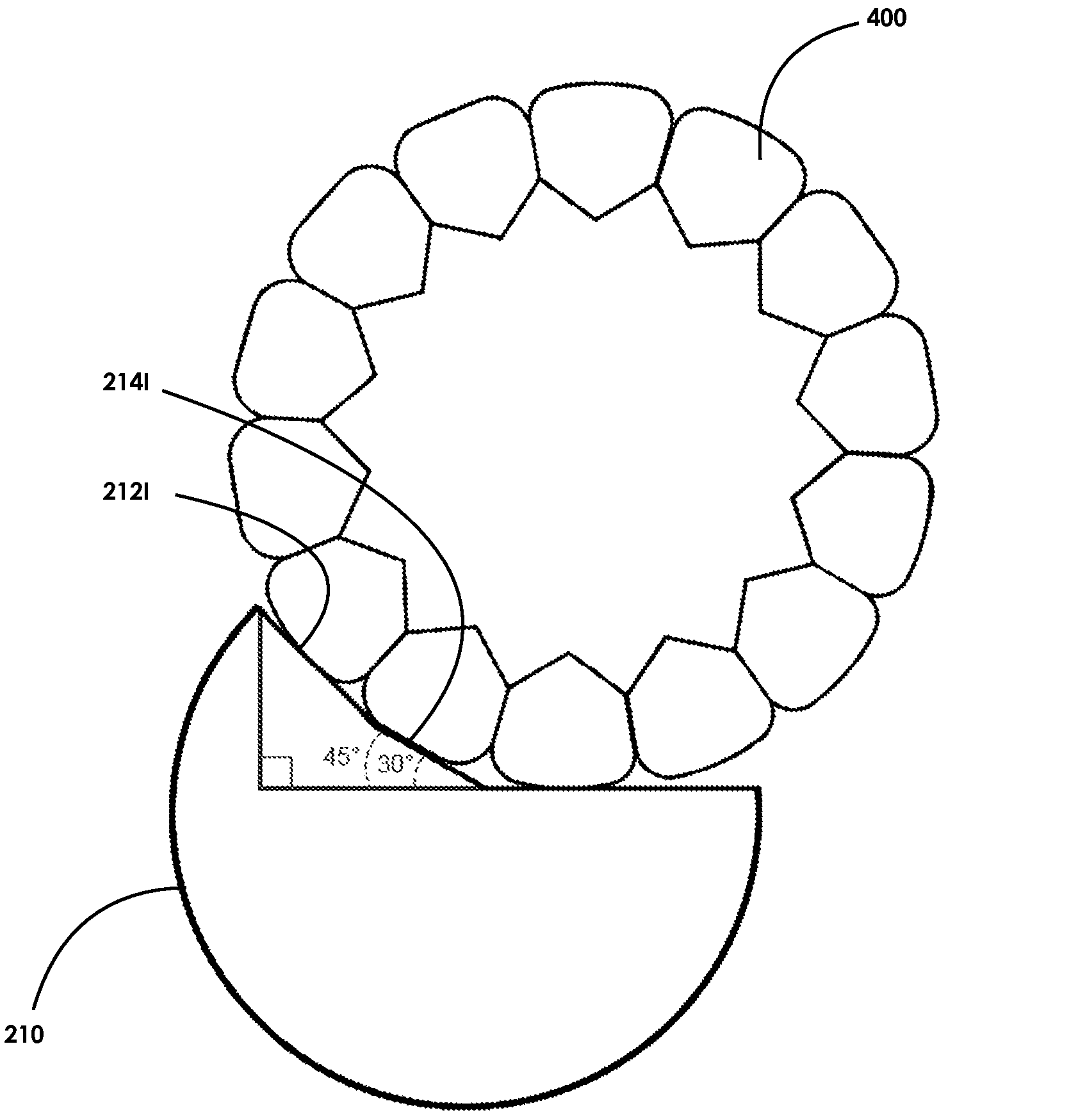
FIG. 3I illustrates a cross-sectional side view for one non-limiting embodiment of a bar having a 30 degree partial cut-out and second 45 degree partial cut-out for the concave bar assembly of the disclosure described herein for crop threshing operations.
Figure 3J:
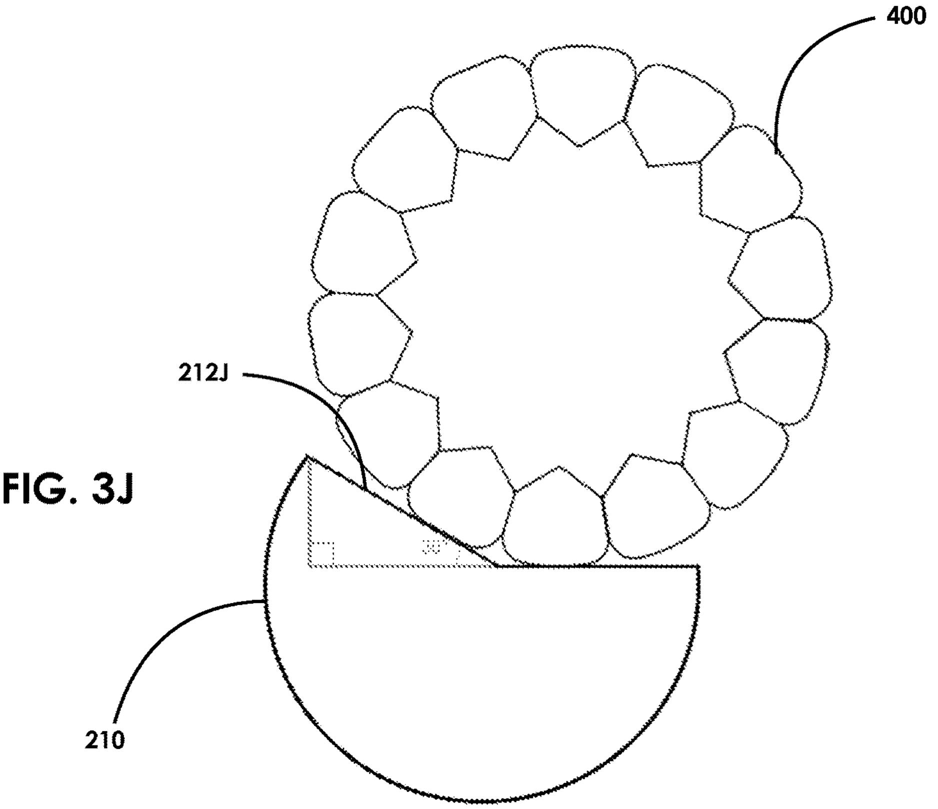
FIG. 3J illustrates a cross-sectional side view for one non-limiting embodiment of a bar having a first 30 degree partial cut-out for the concave bar assembly of the disclosure described herein for crop threshing operations.
Figure 3K:
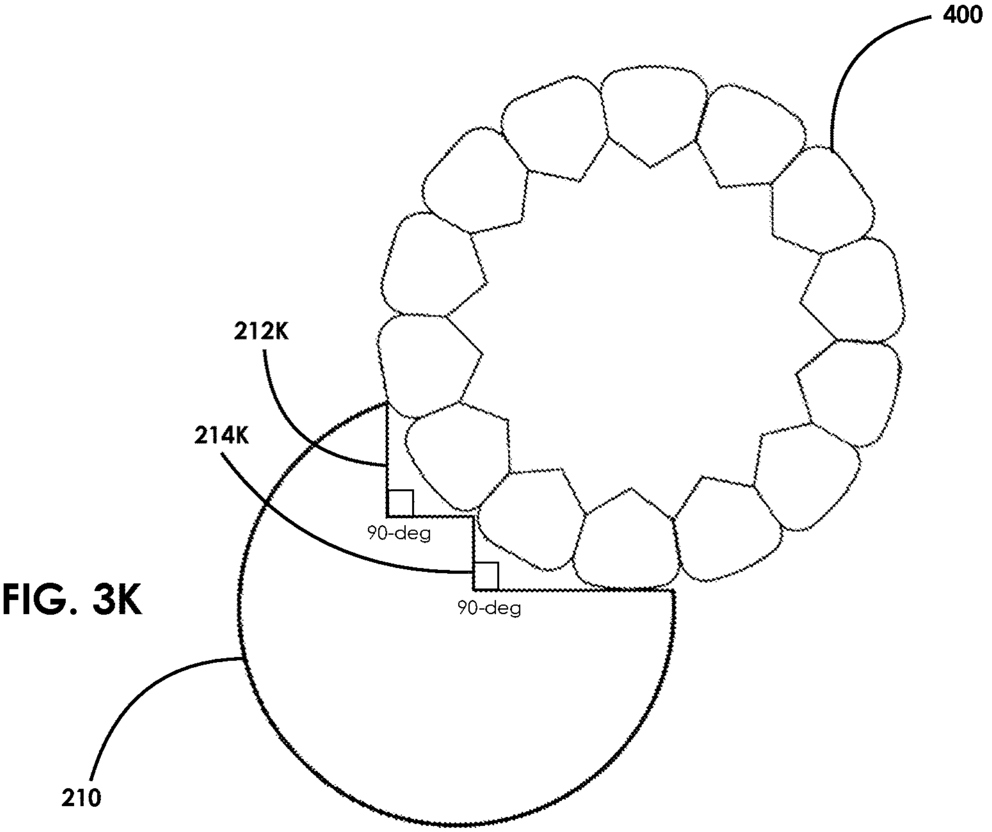
FIG. 3K illustrates a cross-sectional side view for one non-limiting embodiment of a bar having dual or double 90-degree cut-outs for the concave bar assembly of the disclosure described herein for crop threshing operations.

FIG. 3I illustrates a combined or dual angled surfaces 212I and 214I for threshing operations. More specifically, bar 210 of FIG. 3I, can include a first raised surface 212I having an approximate 30 degree angle relative to a horizontal plane, and a second raised surface having a 45 degree angle relative to the horizontal plane. The configuration of FIG. 3I, and other embodiments thereof, can provide a dual or hybrid approach to threshing crop 400. In particular, the lower 30 degree angle can allow a grain or kernel of crop 400 to first make contact (and a first forced impact) with surface area 214I before it makes a second contact (and a second forced impact) with surface area 212I and the sharp edge of bar 210. Here, this dual surface configuration of bar 210 can provide additional threshing to crop 400, wherein if the first contact (and first impact) did not loosen or release the kernel or grain from crop 400, then the second contact (and second impact) can further assist in releasing the kernel or grain from crop 400, thereby essentially combining two rotary threshing operations (or two passes) in one rotary threshing operation (or one pass), thereby significantly improving the efficiency of the threshing operations.

It is contemplated within the scope of the disclosure described herein that any of rods 210 may be comprised of steel material to improve longevity, durability, and wearability, including but not limited to: carbon steels, alloy steels, stainless steels, and tool steels. Preferably, rods 210 may be made of carbon steel, having a carbon content ranging from approximately 0.1 to 1.5%. In particular, a low carbon steel may contain up to 0.3% carbon, a medium carbon steel containing 0.3-0.6% carbon, and a high carbon steel containing more than 0.6% carbon. Moreover, the steel of rods 210 may also be cold formed via processes such as rolling, bending, shearing, and drawing, among others.

TABLES 1-17 illustrate the the various test data simulations for an exemplary tested crop, here a corn cob with a 2-inch cob surface, with respect to a conventional round or cylindrical bar and the various bar 210 configurations or threshing angled surfaces 212A, 212B, 212C, 212D, 212E, 212F, 212G, 212H, 212I, 214I, 212J, 212K, and 214K of the disclosure described herein. In particular, the conditions or constraints of the crop and threshing operation for this particular exemplary test comprised of the following, as shown with respect to TABLE 1:

TABLE 1

| Conditions | |
|---|---|
| 220 | bu/acre |
| 18% | moisture |
| 57.51 | lb/bu |
| 1410 | seeds/lb |
| 81,089 | seeds/bu |
| 27 | mm concave clearance |
| 350 | rpm rotor speed |
| 12 | row head (30 ft) |
| 30 | in corn rows |

TABLE 2

| Conventional Round Bar (Control) | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| Round Bar | 1 | 200 | 30.30 | 24.78 | 81.78% | 10.0 | 5.52 | 7.0 | 7.00% |
| Round Bar | 2 | 200 | 30.30 | 25.33 | 83.60% | 9.0 | 4.97 | 6.0 | 6.00% |
| Round Bar | 3 | 200 | 30.30 | 24.78 | 81.78% | 10.0 | 5.52 | 9.0 | 9.00% |

TABLE 2-continued

| Conventional Round Bar (Control) | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| Round Bar | 4 | 200 | 30.30 | 25.89 | 85.45% | 8.0 | 4.41 | 8.0 | 8.00% |
| Round Bar | 5 | 200 | 30.30 | 25.33 | 83.60% | 9.0 | 4.97 | 6.0 | 6.00% |
| AVERAGE | | | | 25.22 | 83.24% | 9.20 | 5.08 | 7.20 | 7.20% |

TABLE 3

| 20-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 20 Degree | 1 | 200 | 30.30 | 26.49 | 87.43% | 5.0 | 3.81 | 2.0 | 2.00% |
| 20 Degree | 2 | 200 | 30.30 | 25.62 | 84.55% | 6.0 | 4.68 | 2.0 | 2.00% |
| 20 Degree | 3 | 200 | 30.30 | 27.36 | 90.30% | 4.0 | 2.94 | 2.0 | 2.00% |
| 20 Degree | 4 | 200 | 30.30 | 26.43 | 87.23% | 5.0 | 3.87 | 2.0 | 2.00% |
| 20 Degree | 5 | 200 | 30.30 | 27.24 | 89.90% | 4.0 | 3.06 | 1.0 | 1.00% |
| AVERAGE | | | | 26.63 | 87.88% | 4.80 | 3.67 | 1.80 | 1.80% |

TABLE 4

| 25-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 25 Degree | 1 | 200 | 30.30 | 28.29 | 93.37% | 3.0 | 2.01 | 3.0 | 3.00% |
| 25 Degree | 2 | 200 | 30.30 | 28.65 | 94.55% | 2.0 | 1.65 | 2.0 | 2.00% |
| 25 Degree | 3 | 200 | 30.30 | 28.21 | 93.10% | 3.0 | 2.09 | 3.0 | 3.00% |
| 25 Degree | 4 | 200 | 30.30 | 28.64 | 94.52% | 2.0 | 1.66 | 2.0 | 2.00% |
| 25 Degree | 5 | 200 | 30.30 | 28.98 | 95.64% | 2.0 | 1.32 | 1.0 | 1.00% |
| AVERAGE | | | | 28.55 | 94.24% | 2.40 | 1.75 | 2.20 | 2.20% |

TABLE 5

| 30-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 30 Degree | 1 | 200 | 30.30 | 29.58 | 97.62% | 1.0 | 0.72 | 1.0 | 1.00% |

TABLE 5-continued

| 30-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 30 Degree | 2 | 200 | 30.30 | 29.51 | 97.39% | 1.0 | 0.79 | 0.0 | 0.00% |
| 30 Degree | 3 | 200 | 30.30 | 28.82 | 95.12% | 2.0 | 1.48 | 2.0 | 2.00% |
| 30 Degree | 4 | 200 | 30.30 | 29.48 | 97.29% | 1.0 | 0.82 | 0.0 | 0.00% |
| 30 Degree | 5 | 200 | 30.30 | 30.30 | 100.00% | 0.0 | 0 | 1.0 | 1.00% |
| AVERAGE | | | | 29.53 | 97.49% | 1.00 | 0.76 | 0.80 | 0.80% |

TABLE 6

| 35-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 35 Degree | 1 | 200 | 30.30 | 27.96 | 92.28% | 3.0 | 2.34 | 2.0 | 2.00% |
| 35 Degree | 2 | 200 | 30.30 | 28.67 | 94.62% | 2.0 | 1.63 | 1.0 | 1.00% |
| 35 Degree | 3 | 200 | 30.30 | 28.72 | 94.79% | 2.0 | 1.58 | 2.0 | 2.00% |
| 35 Degree | 4 | 200 | 30.30 | 27.99 | 92.38% | 3.0 | 2.31 | 1.0 | 1.00% |
| 35 Degree | 5 | 200 | 30.30 | 28.74 | 94.85% | 2.0 | 1.56 | 0.0 | 0.00% |
| AVERAGE | | | | 28.42 | 93.78% | 2.40 | 1.88 | 1.20 | 1.20% |

TABLE 7

| 40-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 40 Degree | 1 | 200 | 30.30 | 29.57 | 97.59% | 1.0 | 0.73 | 1.0 | 1.00% |
| 40 Degree | 2 | 200 | 30.30 | 28.74 | 94.85% | 2.0 | 1.56 | 1.0 | 1.00% |
| 40 Degree | 3 | 200 | 30.30 | 29.54 | 97.49% | 1.0 | 0.76 | 1.0 | 1.00% |
| 40 Degree | 4 | 200 | 30.30 | 29.55 | 97.52% | 1.0 | 0.75 | 1.0 | 1.00% |
| 40 Degree | 5 | 200 | 30.30 | 28.70 | 94.72% | 2.0 | 1.6 | 2.0 | 2.00% |
| AVERAGE | | | | 29.22 | 96.44% | 1.40 | 1.08 | 1.20 | 1.20% |

TABLE 8

45-Degree Threshing Angle

| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
|---|---|---|---|---|---|---|---|---|---|
| 45 Degree | 1 | 200 | 30.30 | 30.30 | 100.00% | 0.0 | 0 | 0.0 | 0.00% |
| 45 Degree | 2 | 200 | 30.30 | 29.83 | 98.45% | 1.0 | 0.47 | 1.0 | 1.00% |
| 45 Degree | 3 | 200 | 30.30 | 29.20 | 96.37% | 2.0 | 1.1 | 0.0 | 0.00% |
| 45 Degree | 4 | 200 | 30.30 | 29.87 | 98.58% | 1.0 | 0.43 | 1.0 | 1.00% |
| 45 Degree | 5 | 200 | 30.30 | 30.30 | 100.00% | 0.0 | 0 | 0.0 | 0.00% |
| AVERAGE | | | | 29.90 | 98.68% | 0.80 | 0.40 | 0.40 | 0.40% |

TABLE 9

Dual 30-Degree and 45-Degree Threshing Angle Surfaces

| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
|---|---|---|---|---|---|---|---|---|---|
| 45-30 Degree | 1 | 200 | 30.30 | 30.30 | 100.00% | 0.0 | 0 | 0.0 | 0.00% |
| 45-30 Degree | 2 | 200 | 30.30 | 29.91 | 98.71% | 1.0 | 0.39 | 1.0 | 1.00% |
| 45-30 Degree | 3 | 200 | 30.30 | 30.30 | 100.00% | 0.0 | 0 | 0.0 | 0.00% |
| 45-30 Degree | 4 | 200 | 30.30 | 29.89 | 98.65% | 1.0 | 0.41 | 1.0 | 1.00% |
| 45-30 Degree | 5 | 200 | 30.30 | 30.04 | 99.14% | 1.0 | 0.26 | 0.0 | 0.00% |
| AVERAGE | | | | 30.09 | 99.30% | 0.60 | 0.21 | 0.40 | 0.40% |

TABLE 10

50-Degree Threshing Angle

| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
|---|---|---|---|---|---|---|---|---|---|
| 50 Degree | 1 | 200 | 30.30 | 29.56 | 97.56% | 1.0 | 0.74 | 0.0 | 0.00% |
| 50 Degree | 2 | 200 | 30.30 | 28.86 | 95.25% | 2.0 | 1.44 | 1.0 | 1.00% |
| 50 Degree | 3 | 200 | 30.30 | 27.93 | 92.18% | 3.0 | 2.37 | 0.0 | 0.00% |
| 50 Degree | 4 | 200 | 30.30 | 28.76 | 94.92% | 2.0 | 1.54 | 1.0 | 1.00% |
| 50 Degree | 5 | 200 | 30.30 | 29.56 | 97.56% | 1.0 | 0.74 | 0.0 | 0.00% |
| AVERAGE | | | | 28.93 | 95.49% | 1.80 | 1.37 | 0.40 | 0.40% |

TABLE 11

55-Degree Threshing Angle

| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
|---|---|---|---|---|---|---|---|---|---|
| 55 Degree | 1 | 200 | 30.30 | 26.45 | 87.29% | 5.0 | 3.85 | 2.0 | 2.00% |
| 55 Degree | 2 | 200 | 30.30 | 27.15 | 89.60% | 4.0 | 3.15 | 2.0 | 2.00% |
| 55 Degree | 3 | 200 | 30.30 | 26.49 | 87.43% | 5.0 | 3.81 | 2.0 | 2.00% |
| 55 Degree | 4 | 200 | 30.30 | 25.62 | 84.55% | 6.0 | 4.68 | 3.0 | 3.00% |
| 55 Degree | 5 | 200 | 30.30 | 26.55 | 87.62% | 5.0 | 3.75 | 1.0 | 1.00% |
| AVERAGE | | | | 26.45 | 87.30% | 5.00 | 3.85 | 2.00 | 2.00% |

TABLE 12

60-Degree Threshing Angle

| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
|---|---|---|---|---|---|---|---|---|---|
| 60 Degree | 1 | 200 | 30.30 | 26.40 | 87.13% | 5.0 | 3.9 | 3.0 | 3.00% |
| 60 Degree | 2 | 200 | 30.30 | 26.35 | 86.96% | 5.0 | 3.95 | 3.0 | 3.00% |
| 60 Degree | 3 | 200 | 30.30 | 27.22 | 89.83% | 4.0 | 3.08 | 2.0 | 2.00% |
| 60 Degree | 4 | 200 | 30.30 | 25.50 | 84.16% | 6.0 | 4.8 | 3.0 | 3.00% |
| 60 Degree | 5 | 200 | 30.30 | 26.40 | 87.13% | 5.0 | 3.9 | 2.0 | 2.00% |
| AVERAGE | | | | 26.37 | 87.04% | 5.00 | 3.93 | 2.60 | 2.60% |

TABLE 13

65-Degree Threshing Angle

| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
|---|---|---|---|---|---|---|---|---|---|
| 65 Degree | 1 | 200 | 30.30 | 26.55 | 87.62% | 5.0 | 3.75 | 5.0 | 5.00% |
| 65 Degree | 2 | 200 | 30.30 | 26.60 | 87.79% | 5.0 | 3.7 | 6.0 | 6.00% |
| 65 Degree | 3 | 200 | 30.30 | 26.65 | 87.95% | 5.0 | 3.65 | 6.0 | 6.00% |
| 65 Degree | 4 | 200 | 30.30 | 25.19 | 83.14% | 7.0 | 5.11 | 5.0 | 5.00% |
| 65 Degree | 5 | 200 | 30.30 | 25.86 | 85.35% | 6.0 | 4.44 | 5.0 | 5.00% |
| AVERAGE | | | | 26.17 | 86.37% | 5.60 | 4.13 | 5.40 | 5.40% |

TABLE 14

| 90-Degree Threshing Angle | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| 90 Degree | 1 | 200 | 30.30 | 26.87 | 88.68% | 4.0 | 3.43 | 10.0 | 10.00% |
| 90 Degree | 2 | 200 | 30.30 | 26.42 | 87.19% | 5.0 | 3.88 | 12.0 | 12.00% |
| 90 Degree | 3 | 200 | 30.30 | 27.28 | 90.03% | 4.0 | 3.02 | 9.0 | 9.00% |
| 90 Degree | 4 | 200 | 30.30 | 26.27 | 86.70% | 5.0 | 4.03 | 11.0 | 11.00% |
| 90 Degree | 5 | 200 | 30.30 | 26.49 | 87.43% | 4.0 | 3.81 | 9.0 | 9.00% |
| AVERAGE | | | | 26.67 | 88.01% | 4.40 | 3.63 | 10.20 | 10.20% |

TABLE 15

| Dual 90-Degree Threshing Angles | | | | | | | | | |
|---|---|---|---|---|---|---|---|---|---|
| TYPE | PASS # | PASS LENGTH (ft) | THEORETICAL GRAIN VOLUME (Bu) | EMPIRICAL GRAIN VOLUME | THRESHING EFFICIENCY | GRAIN LOSS (1 SQ FT) | GRAIN LOSS PER ACRE (Bu) | GRAIN DAMAGE TANK (100 KERNELS) | PERCENT |
| Double 90 Degree | 1 | 200 | 30.30 | 29.05 | 95.87% | 2.0 | 1.25 | 8.0 | 8.00% |
| Double 90 Degree | 2 | 200 | 30.30 | 28.57 | 94.29% | 3.0 | 1.73 | 10.0 | 10.00% |
| Double 90 Degree | 3 | 200 | 30.30 | 28.41 | 93.76% | 3.0 | 1.89 | 9.0 | 9.00% |
| Double 90 Degree | 4 | 200 | 30.30 | 28.25 | 93.23% | 4.0 | 2.05 | 10.0 | 10.00% |
| Double 90 Degree | 5 | 200 | 30.30 | 28.87 | 95.28% | 2.0 | 1.43 | 9.0 | 9.00% |
| AVERAGE | | | | 28.63 | 94.49% | 2.80 | 1.67 | 9.20 | 9.20% |

TABLE 16

| Trend Analysis of Threshing Angles | | | | |
|---|---|---|---|---|
| THRESH-ING ANGLE | 2" COB SURFACE AREA | THRESHING SURFACE AREA | THRESHING EFFICIENCY | % DAMAGE |
| Ideal | 262.0 | 100.00% | 100.0% | 0.0% |
| 30-45 | 252.6 | 96.4% | 99.3% | 0.4% |
| 45 | 195.6 | 74.7% | 98.7% | 0.4% |
| 30 | 174.7 | 66.7% | 97.5% | 0.8% |
| 40 | 154.2 | 58.9% | 96.4% | 1.4% |
| 50 | 132.4 | 50.55% | 95.5% | 1.2% |
| Double 90 | 96.6 | 36.9% | 94.5% | 9.2% |
| 25 | 121.2 | 46.2% | 94.2% | 2.2% |
| 35 | 120.3 | 45.9% | 93.8% | 1.2% |
| 90 | 90.0 | 34.3% | 88.0% | 10.2% |
| 20 | 106.7 | 40.7% | 87.9% | 1.8% |
| 55 | 100.6 | 38.4% | 87.3% | 2.0% |
| 60 | 93.7 | 35.75% | 87.0% | 2.6% |
| 65 | 92.7 | 35.4% | 86.4% | 5.4% |
| Round Bar | 83.4 | 31.8% | 83.2% | 7.2% |

TABLE 17

| Results Summary of Threshing Angles | | | | |
|---|---|---|---|---|
| THRESH-ING ANGLE | 2" COB SURFACE AREA | THRESHING SURFACE AREA | THRESHING EFFICIENCY | % DAMAGE |
| 20 | 106.7 | 40.7% | 87.9% | 1.8% |
| 25 | 121.2 | 46.2% | 94.2% | 2.2% |
| 30 | 174.7 | 66.7% | 97.5% | 0.8% |
| 35 | 120.3 | 45.9% | 93.8% | 1.2% |
| 40 | 154.2 | 58.9% | 96.4% | 1.4% |
| 45 | 195.6 | 74.66% | 98.7% | 0.4% |
| 50 | 132.4 | 50.5% | 95.5% | 1.2% |
| 55 | 100.6 | 38.4% | 87.3% | 2.0% |
| 60 | 93.7 | 35.8% | 87.0% | 2.6% |
| 65 | 92.7 | 35.4% | 86.4% | 5.4% |
| 90 | 90.0 | 34.3% | 88.0% | 10.2% |
| 30-45 | 252.6 | 96.4% | 99.3% | 0.4% |
| Double 90 | 96.6 | 36.88% | 94.5% | 9.2% |
| Round Bar | 83.4 | 31.8% | 83.2% | 7.2% |
| Ideal | 262.0 | 100.00% | 100.0% | 0.0% |

As shown in the trend analysis and summary of results of TABLES 16 and 17, the dual 30-45 degree surface angles, as depicted in FIG. 3I, provided the most optimal threshing efficiency (99.3%) of the tested crop and further resulting in the least amount damage (0.4%) to the crop. In second place, the 45-degree surface angle, as depicted in FIG. 3E, provided an optimal threshing efficiency of (98.7%) of the tested crop which further resulted in minimal damage (0.4%) to the crop. In contrast, the conventional cylindrical or round bar resulted in the least threshing efficiency (83.2%) of the tested crop with significant damage (7.2%) to the crop. From these results, it can be observed that any of the configurations for bars 210 provide a significant improvement over conventional concave threshing apparatuses.

Concave Separation Grate

Figure 4:
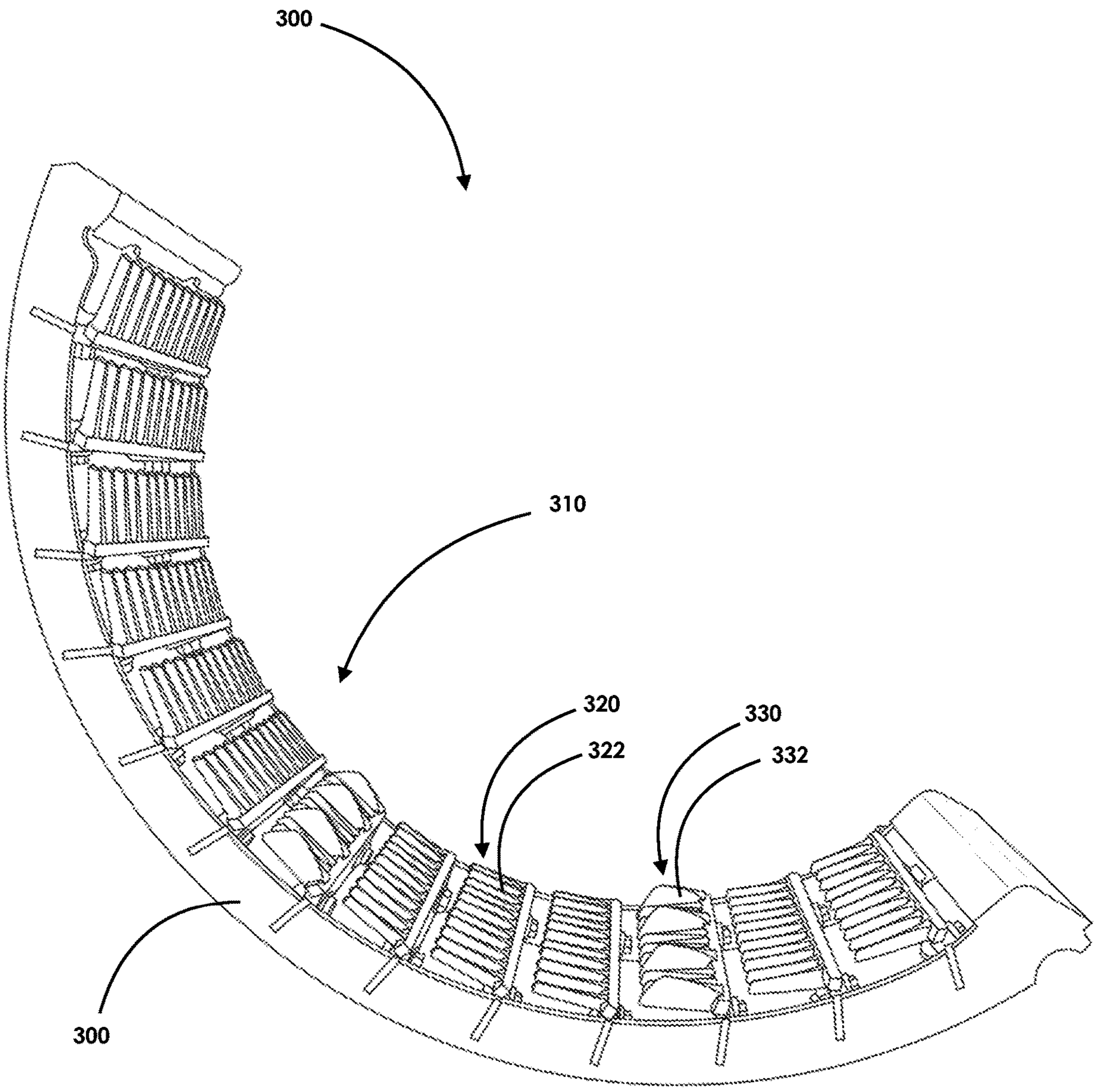
FIG. 4 illustrates a perspective side view for one non-limiting embodiment of a concave separator grate assembly of the disclosure described herein for crop separation operations.
Figure 5:
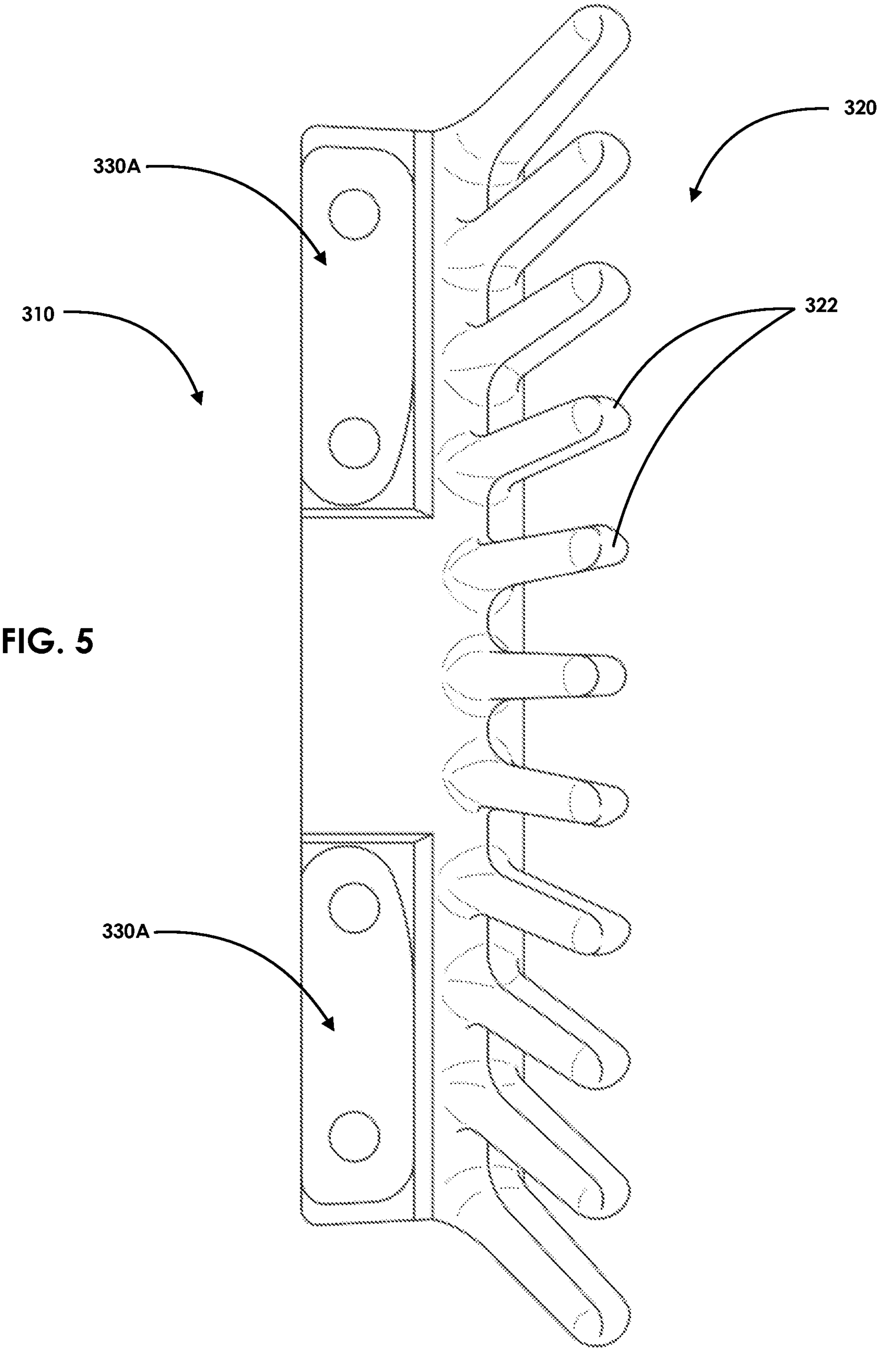
FIG. 5 illustrates a top view of a bracket or grate member in one non-limiting embodiment having mounting points and further having a row of uniform small fingers or small protruding members of the separation grate of the disclosure described herein for crop separation operations.

Referring now to FIGS. 4-12, a separation grate of the disclosure described herein is disclosed for the combine harvester. In particular, FIG. 4 illustrates one embodiment of a concave separation grate 300 of the disclosure described herein. Here, concave 300 can include various interchangeable bracket or grate members 310 secured laterally within concave 300. Here, each grate or bracket member 310 can include various combination of fingers or protruding members for separation operations of a crop, such as crop 400. For example, a grate or bracket member 320 may include an axially aligned row of small finger or small protrusion members 322 for separation operations, as also shown in FIG. 5. In addition, a bracket member 330 may include a combination of large finger or large protrusion members 332 in combination with small protrusion members 322, as also shown in FIGS. 6A-6B. Here, any of protrusion fingers of the bracket or grate member may resemble a rake or comb configuration.

FIG. 5 illustrates a top view of an interchangeable bracket member 310, and more specifically grate or bracket 320, having having a plurality of small finger protrusions 322. In particular, each of bracket member 310 includes dual mounting points or mounting areas 330A wherein each can include a depression having at least two apertures for inserting a fastener therethrough, such as a nut and bolt, for attaching and securing bracket member 310 to concave 300. In addition, mounting areas 330A can also be used to interchange, secure, and mount other finger protrusions to a bracket member, such as mounting individual large fingers 332 or 334 to a bracket member, either alone, or in combination with the small finger protrusions 322.

Figure 6A:
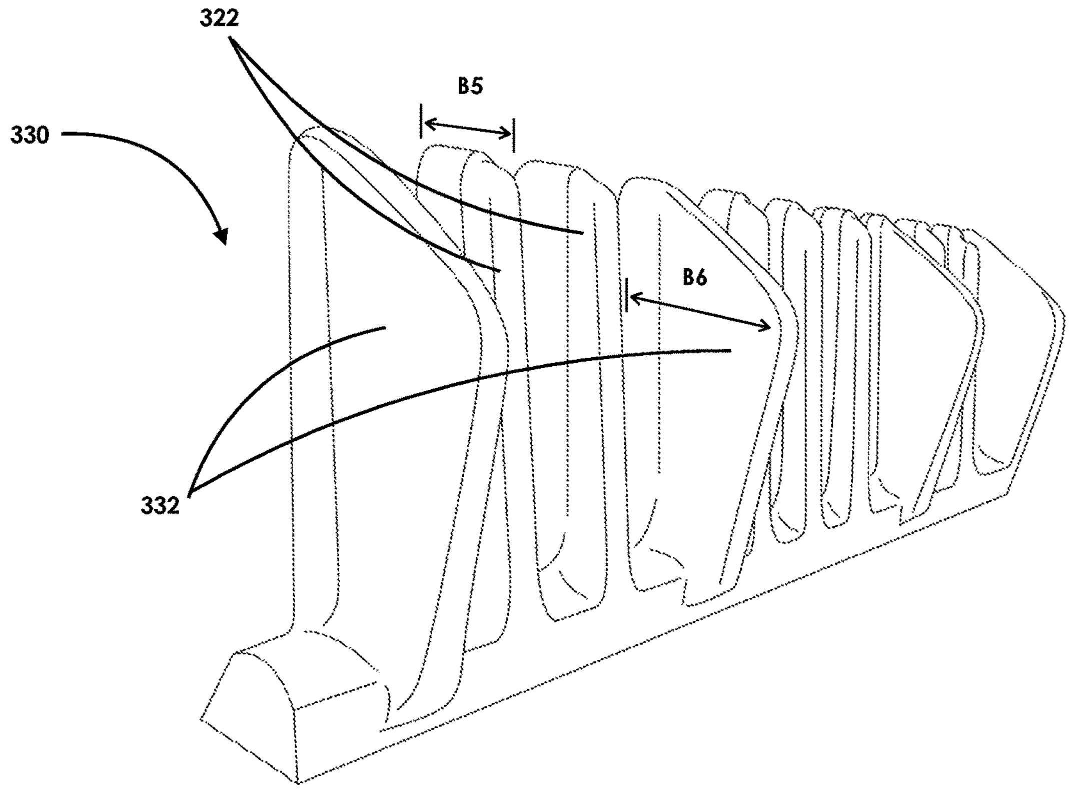
FIG. 6A illustrates a perspective side view of another bracket or grate member having having a row of uniform small fingers or protruding members that are intermixed or combined with large fingers or large protruding members of the separation grate of the disclosure described herein for crop separation operations.
Figure 6B:
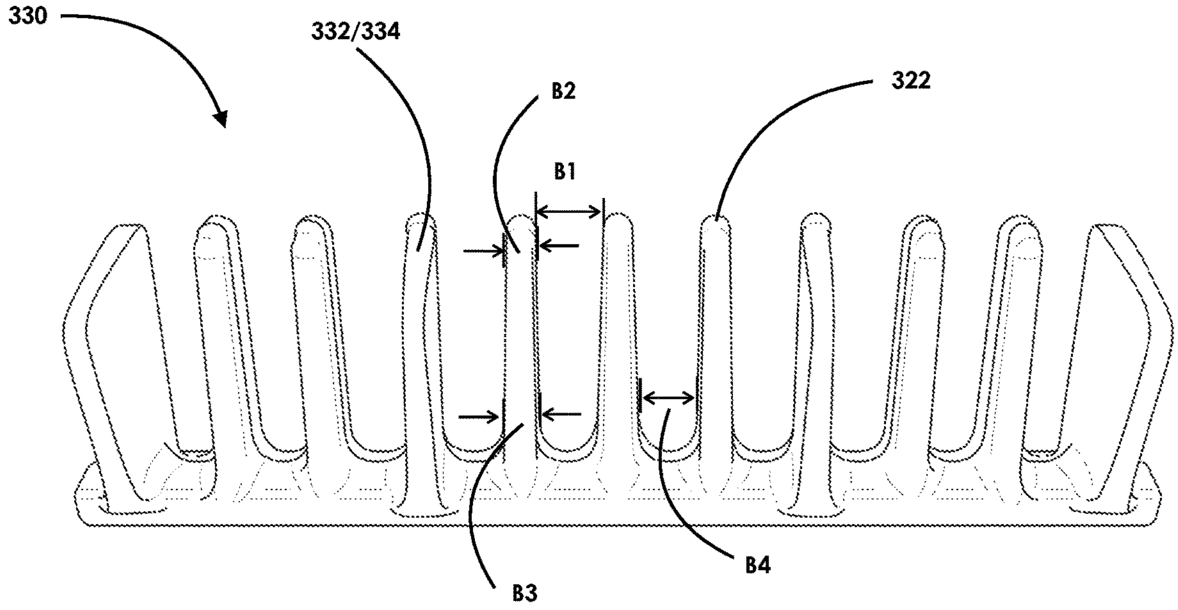
FIG. 6B illustrates a perspective front view of the embodiment of FIG. 6A.
Figure 6C:
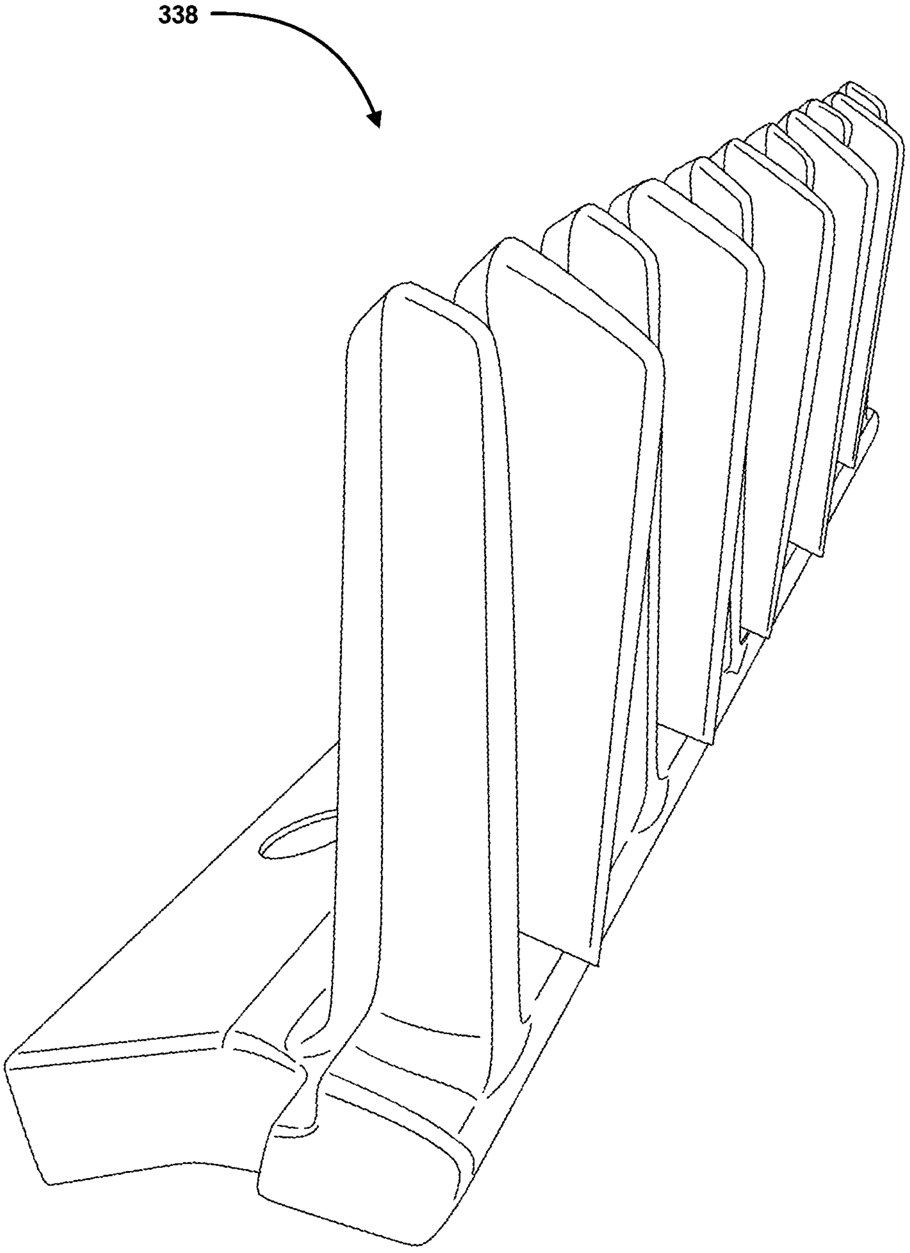
FIG. 6C illustrates a perspective side view of another non-limiting embodiment of a small finger or small protruding member and large finger or large protruding member alternating configuration for a bracket member.

FIGS. 6A-6B illustrate one configuration of a bracket member 310, and more specifically bracket 330, having a combination of small finger protrusions 322 along with large finger protrusions 332 (which may also be serrated protrusions 334). Here, each protrusion 322 and 332/334 are equally spaced apart from each other. Namely, as measured from the top or distal end region of each small or large finger or protrusion, there is a space B1 having an approximate 0.75 inches between each protrusion. In addition, from the lower or proximal region of each small or large protrusion, there is a space B4 having an approximate 0.625 inches between each protrusion. Moreover, from the top or distal end region of each small or large finger or protrusion, each has a width or thickness B2 having approximately 0.375 inches and a lower or proximal region having with a width or thickness B3 having approximately 0.5 inches. Further, large fingers 332 can have a width or thickness ranging from 1.0-inches up to 2.0-inches, preferably 1.5-inches. In addition, small fingers 322 can have a width or thickness ranging from 0.5-inches up to 1.0-inches, preferably 0.75-inches. However, it is contemplated within the scope of the disclosure described herein that each finger or protrusion may be configured at any spacing with respect to each other and be comprised of any desirable width or thickness. FIG. 6C illustrates another embodiment for the bracket member 338 having a plurality of large and small width finger protrusions in an alternating configuration. Here, any of the larger or smaller width finger protrusions may comprise a width or thickness ranging from 0.5 inches up to and including 1.5 inches.

Figure 7:
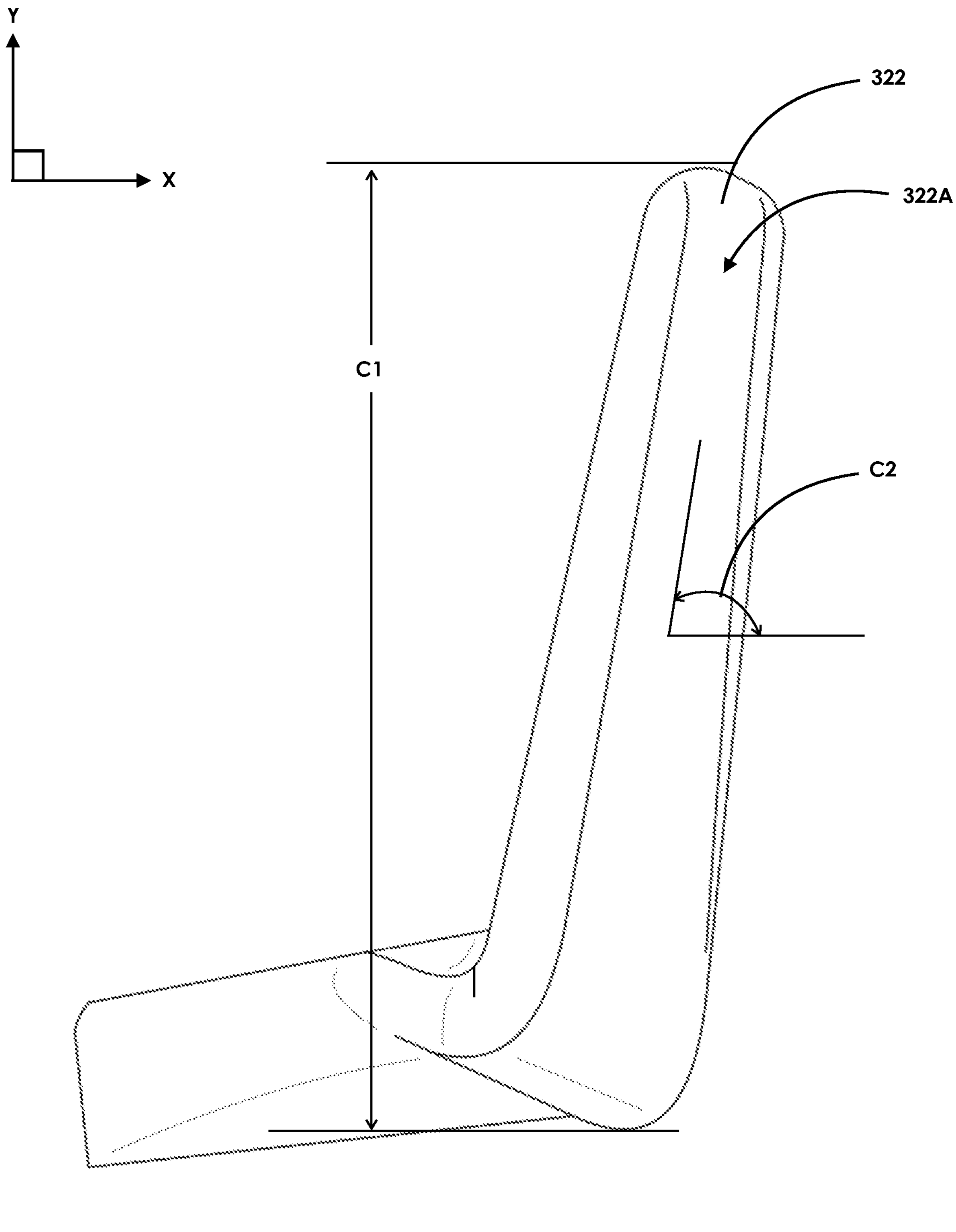
FIG. 7 illustrates a perspective side view of one non-limiting embodiment of the small finger or small protruding member of the separation grate of the disclosure described herein for crop separation operations.
Figure 8:
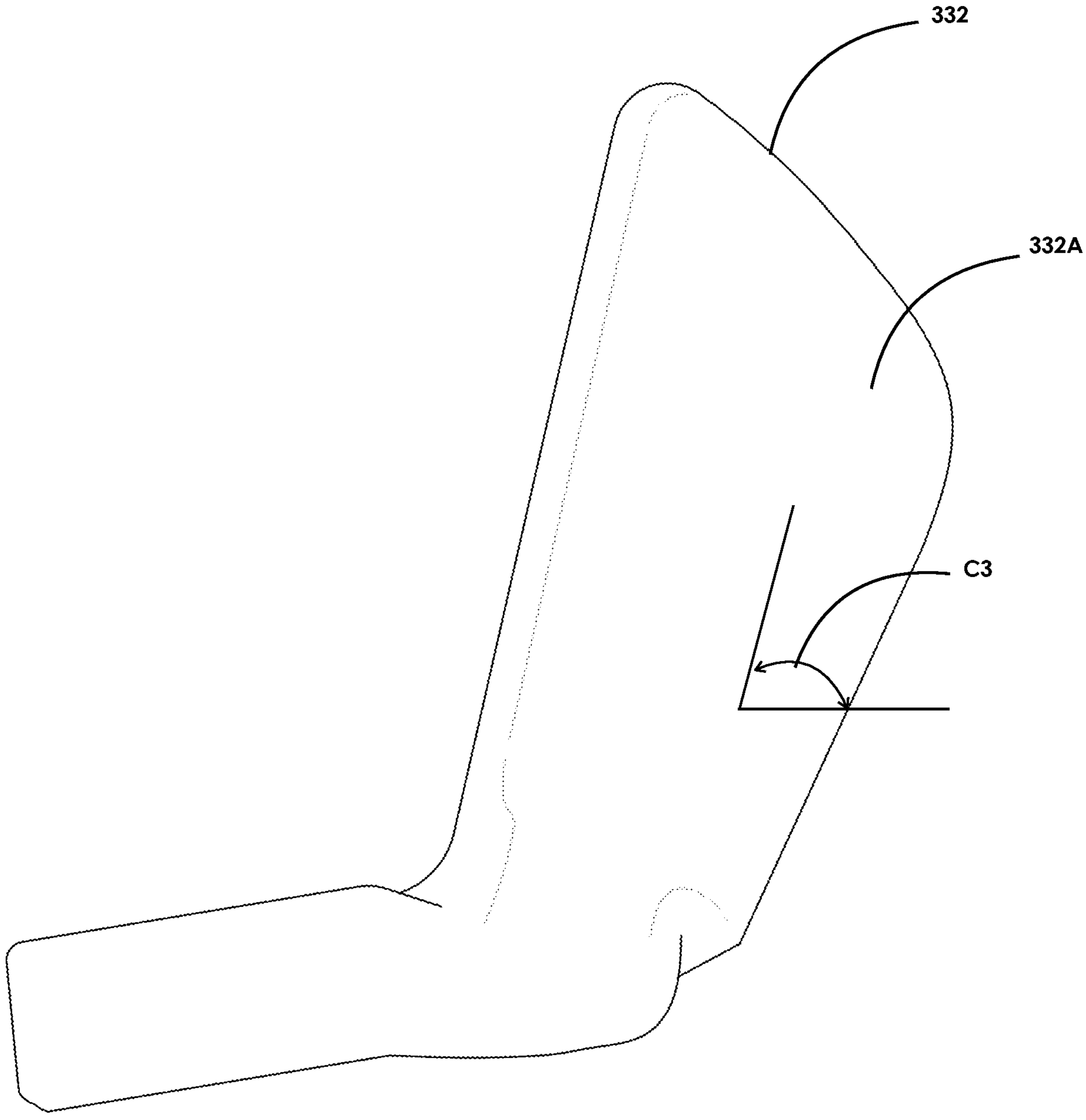
FIG. 8 illustrates a perspective side view for one non-limiting embodiment of the large finger or large protruding member of the separation grate having a smooth outer edge of the disclosure described herein for crop separation operations.

FIG. 7 illustrates a close-up view of a small finger protrusion member 322 of the disclosure described herein. In particular, protrusion 322 can include a beveled, rounded, or smooth outer surface 322A to minimize or eliminate damage to a crop that is being processed through the separation operation. Alternatively, in other embodiments, surface 322A may include a sharp, teethed, serrated, rough, or textured surface area, depending on the type of crop to be separated. In addition, protrusion member 322 is configured at a tilted angle C2 between 50 to 90 degrees, and preferably approximately 78 degrees, relative to a horizontal plane. FIG. 8 illustrates a large finger protrusion member 332 of the disclosure described herein. In particular, protrusion 332 can include a beveled, rounded, or smooth outer surface 332A to minimize or eliminate damage to a crop that is being processed through the separation operation. Alternatively, in other embodiments, surface 332A may include a sharp, teethed, serrated, rough, or textured surface area, depending on the type of crop to be separated. In addition, protrusion member 332 is configured at a tilted angle C3 between 50 to 90 degrees, and preferably approximately 78 degrees, relative to a horizontal plane.

Figure 9:
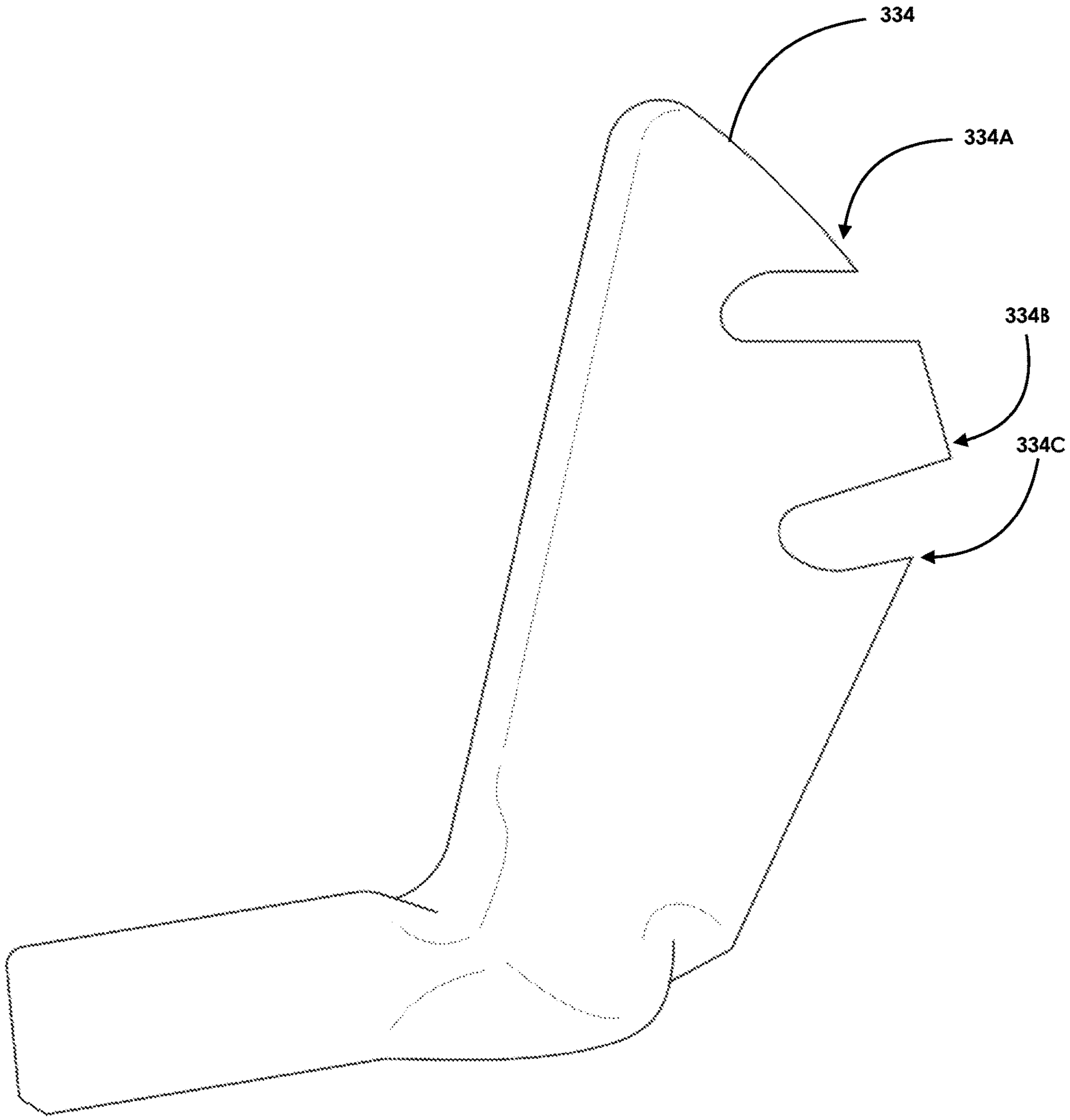
FIG. 9 illustrates a perspective side view of another non-limiting embodiment of the large finger or large protruding member of the separation grate having a sharp serrated edge or teeth members of the disclosure described herein for crop separation operations.
Figure 10:
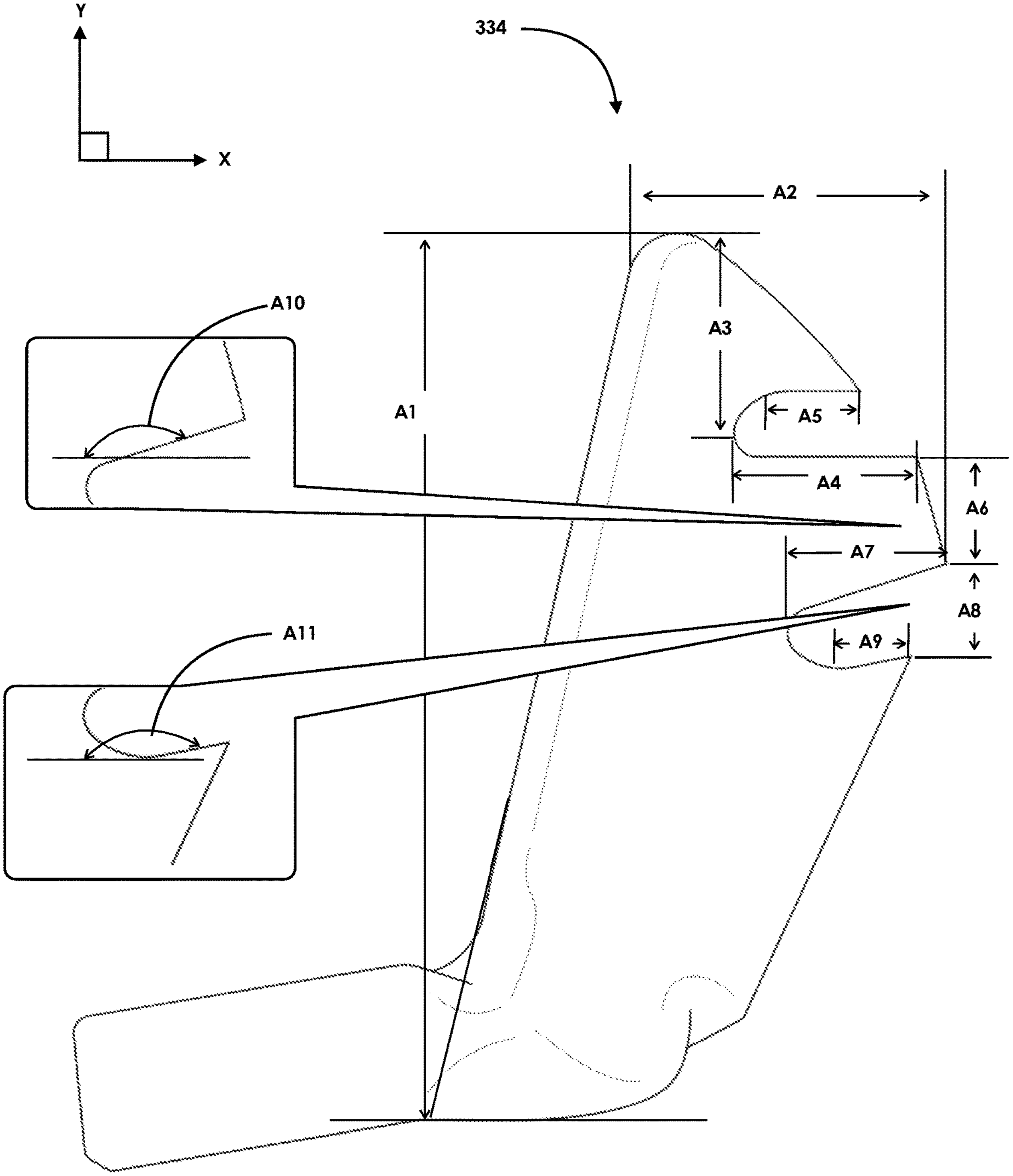
FIG. 10 illustrates another perspective side view of the embodiment of FIG. 9, shown with dimensions for various areas of the large finger or large protruding member having a serrated edge or teeth members of the disclosure described herein for crop separation operations.

FIG. 9 illustrates another embodiment of a large finger protrusion member 334 having a serrated or teethed edge for heavier threshing operations. In particular, protrusion member a jagged or serrated teeth 334A comprised of a cut-out between 334A and 334B, a second jagged or serrated teeth 334B comprised of a cut-out between 334B and 334C, and a third jagged or serrated teeth 334C comprised of a cut-out between 334B and 334C. FIG. 10 illustrates a more detailed dimensional view of the serrated large finger protrusion member 334 of FIG. 9. In particular, member 334 can have a height or length A1 of approximately 3.0 inches, side width A2 of approximately 1.5 inches, a region A3 of approximately 0.75 inches, another region A4 of approximately 0.5 inches, another region A5 of approximately 0.25 inches, another region A6 of approximately 0.5 inches, another region A7 of approximately 0.5 inches, another region A8 of approximately 0.2 inches, and another region A9 of approximately 0.2 inches. In addition, serrated teeth region 334B can have an angle A10 of approximately 160 degrees, and serrated teeth region 334C can have an angle A11 of approximately 160 degrees. Here, it is contemplated within the scope of the disclosure described herein that each bracket member can have varying length and width fingers or protrusions relative each other. For example, a bracket member can have a row of varying finger widths, wherein the width of a finger adjacent to another finger can vary anywhere from 5% up to and including 50%, or such as approximately a 10% variation.

Figure 11A:
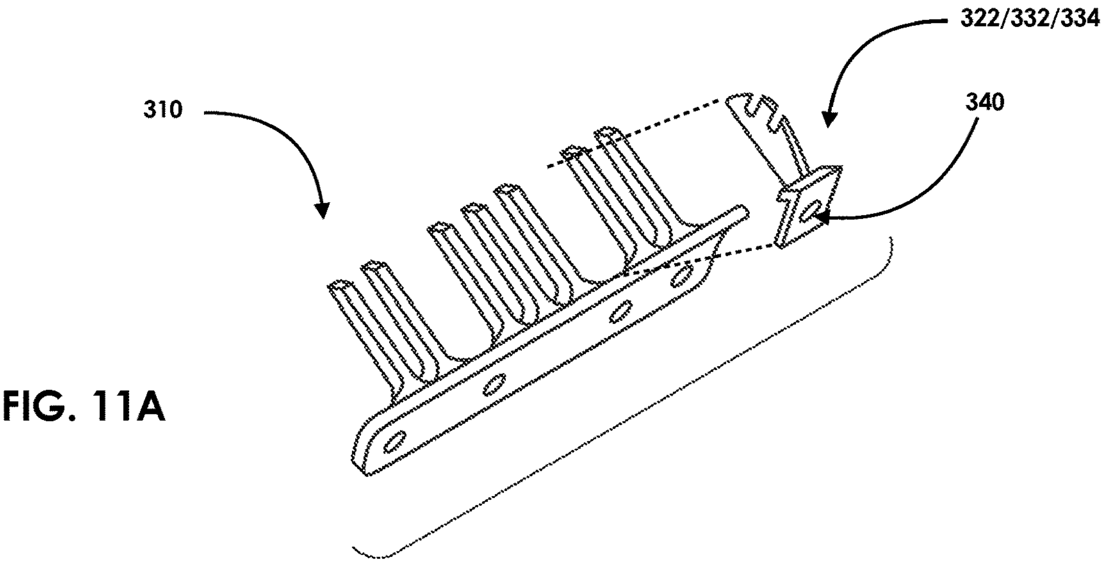
FIGS. 11A-11C illustrates perspective views of a bracket or grate member in a method of assembling a large finger or large protruding member of the separation grate to the bracket member of the disclosure described herein.
Figure 11B:
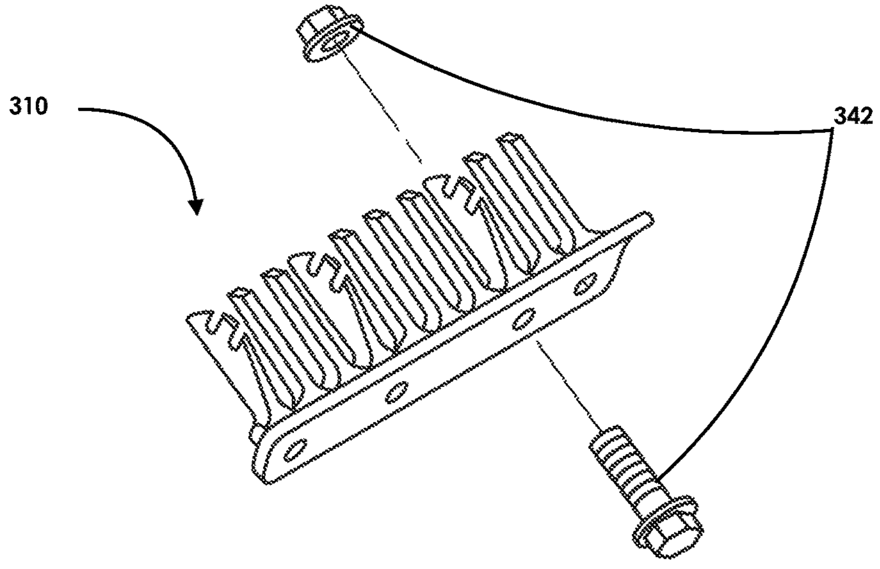
Figure 12:
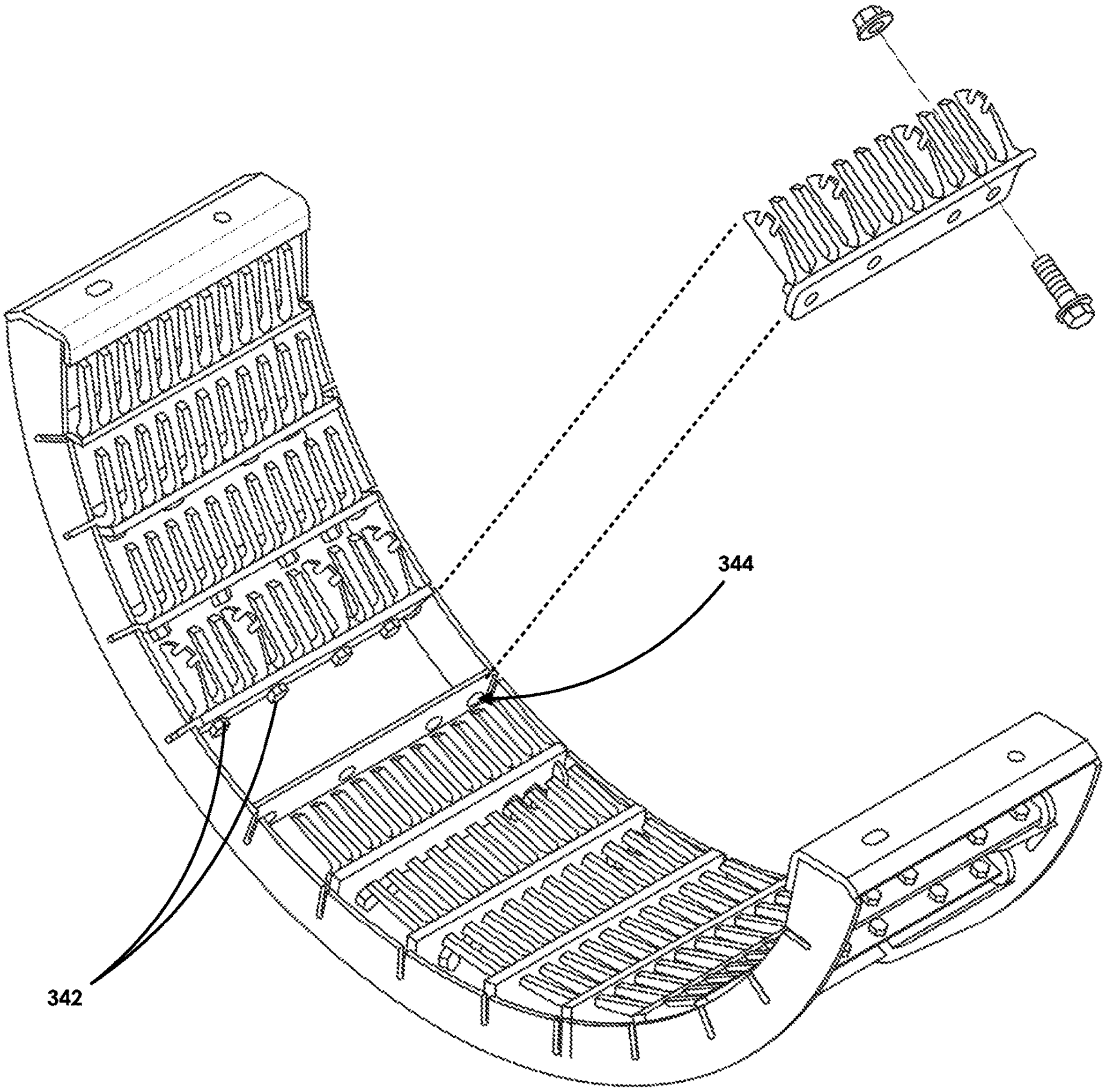
FIG. 12 illustrates a perspective view of the bracket or grate member in a method of securing the bracket member to the separation grate of the disclosure described herein for crop separation operations.

FIGS. 11A-11B illustrate one method of interchanging, removing, installing, or securing an individual finger or protrusion member to any of grate or bracket members 310 and concave assembly 300, such as finger 322, 332, or 334 of the disclosure described herein. In particular, the finger protrusion member can have an aperture or mounting region 340 that allows it to be axially aligned with one or more mounting points or mounting regions on bracket 310, such as regions 330A, as shown in FIG. 5, and also axially aligning the aforementioned mounting points with an aperture and mounting point 344 of concave assembly 300, as shown in FIG. 12. Here, once the mountings regions of both the finger protrusion, bracket member, and concave assembly are aligned, a fastener 342 is threaded therethrough, thereby securing finger 322, 332, or 334 to grate or bracket member 310 and concave assembly 300. However, it is contemplated within the scope of the disclosure that any other type of securement means may be used to secure a finger protrusion member to the bracket members, such as via rivets, clamps, clasps, straps, adhesives, or via any type of welding operation.

Here, it is noted that the separation concave grate assembly 300 of the disclosure described herein is configured such that it can be as open as possible to provide various grains of a crop the highest probability of falling through the grate or bracket members 310 and be subsequently captured. Further, the finger protrusion members 322, 332, and 334 have been elevated, tilted, or raised in the secured positions, as shown in FIG. 4, such that the separation concave grate interrupts the previously threshed crop material as much as possible in order to create as much separation as possible of grain from MOG (i.e. chaff, shucks, stalk, leafy material) such that the grain can be captured by the combine before being diverted or discharged out of the back of the combine or lost. To further illustrate, the agitating finger members of one row of brackets or grates of the disclosure described herein can take the straw and chaff and toss it upwards, and as it falls onto the next set of fingers of another row of brackets or grates, thereby causing the grain to fall through the openings of assembly 300, in a repeated operation. In addition, the serrated large finger protrusions, such as shown in FIGS. 9-10, allow the serrated-like to snag any MOG, such as stems or leafy material, that may be carrying out grain with it. In one method of operation, the elevated small fingers 322 are generally configured to toss or fluff the MOG whereas the serrated or non-serrated large fingers are configured to grab, pull, or snag any MOG in the separation section. Here, the small and large finger protrusions work to together in order to provide optimal and maximum interruption of MOG before it is discharged out of the the back of the combine. In particular, the more dense, thick, and less porous the MOG, crop material, or straw layer is, the more agitation that is required to toss, break-up, and release any threshold grain from the MOG, crop material, or straw layer.

Figure 11C:
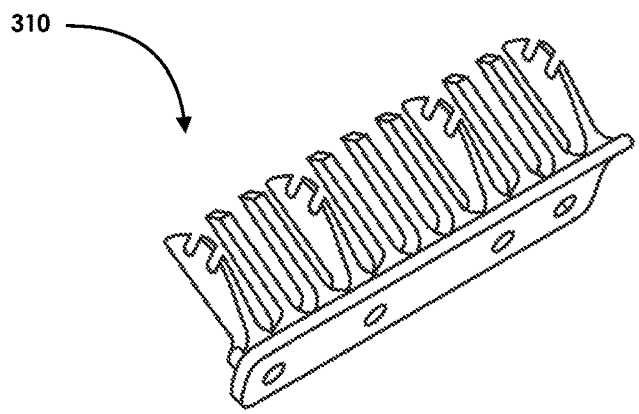

Further, the increased spacing of any of the finger protrusion members, such as 322, 332, and 334, allows the grain to more easily fall through between the fingers to be captured in the chaff and grain mixture while the long pieces of straw, shuck, and other MOG are displaced rearwardly and discharged out the back of the combine. In particular, the finger protrusion members are spaced apart from each other on bracket or grate member 310 so as to assure effective separation of the grain while preventing passage of an undesirable amount of MOG through the grates. Here, the disclosed spacing and finger protrusion configurations provide thorough separation between the coarse straw, grain, chaff, and MOG while capturing threshed grain that may have not capture in the threshing concave bar, such as concave assembly 200. Further, the alternating configuration of the various size/configuration fingers, such as shown in FIGS. 6A and 11C, is optimized to allow for more agitation, interruption, and disruption of the crop material. Here, the aforementioned-elevated finger protrusion configurations on the bracket or grate members can be similar to measuring surface roughness. Here, separation effectiveness can be found to be a function of roughness, wherein the more rough the grate (i.e. varying height of fingers/more peaks and valleys in separator grate), the more tossing and fluffing of the crop and thus the more effective separation of grain from MOG which results in more grain retained by the combined rather than being diverted out of the combine or lost.

It is contemplated within the scope of the disclosure described herein that any of finger protrusions 322, 332, and 334 may be comprised of steel material to improve longevity, durability, and wearability, including but not limited to: carbon steels, alloy steels, stainless steels, and tool steels. Preferably, protrusions 322, 332, and 334 may be made of carbon steel, having a carbon content ranging from approximately 0.1 to 1.5%. In particular, a low carbon steel may contain up to 0.3% carbon, a medium carbon steel containing 0.3-0.6% carbon, and a high carbon steel containing more than 0.6% carbon. Moreover, the steel protrusions 322, 332, and 334 may also be cold formed, via processes such as rolling, bending, shearing, and drawing, among others.

TABLES 18-30 illustrate the the various test data simulations for an exemplary tested crop, such as a corn cob, with respect to a conventional separation grates and the various finger protrusions 322, 332, and 334 for grate or bracket members 310 or 320 of the disclosure described herein. In particular, the conditions or constraints of the crop and separation operation for this particular exemplary test are shown with respect to TABLE 18:

TABLE 18

| Conditions | |
|---|---|
| 260 | bu/acre |
| 16% | moisture |
| 56.33 | lb/bu |
| 1566 | seeds/lb |
| 88,212 | seeds/bu |
| 29 | mm concave clearance |
| 320 | rpm rotor speed |
| 12 | row head (30 ft) |
| 30 | in corn rows |

TABLE 19

Conventional Separation Grate (Control) with 0.25-in Width or Thickness Fingers

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 0 | 0.25 | 1 | 200 | 35.81 | 31.32 | 87.45% | 12.0 | 4.49 |
| 0 | 0.25 | 2 | 200 | 35.81 | 31.52 | 88.02% | 11.0 | 4.29 |
| 0 | 0.25 | 3 | 200 | 35.81 | 30.98 | 86.51% | 13.0 | 4.83 |
| 0 | 0.25 | 4 | 200 | 35.81 | 31.47 | 87.89% | 11.0 | 4.34 |
| 0 | 0.25 | 5 | 200 | 35.81 | 31.12 | 86.90% | 12.0 | 4.69 |
| AVERAGE | | | | | 31.28 | 87.35% | 11.80 | 4.53 |

TABLE 20

4-Small Fingers with 0.75-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 4 | 0.75" | 1 | 200 | 35.81 | 32.02 | 89.41% | 10.0 | 3.79 |
| 4 | 0.75" | 2 | 200 | 35.81 | 31.57 | 88.17% | 11.0 | 4.24 |
| 4 | 0.75" | 3 | 200 | 35.81 | 31.27 | 87.33% | 12.0 | 4.54 |
| 4 | 0.75" | 4 | 200 | 35.81 | 31.51 | 88.00% | 11.0 | 4.30 |
| 4 | 0.75" | 5 | 200 | 35.81 | 31.14 | 86.95% | 12.0 | 4.67 |
| AVERAGE | | | | | 31.50 | 87.97% | 11.20 | 4.31 |

TABLE 21

8-Small Fingers with 0.75-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 8 | 0.75" | 1 | 200 | 35.81 | 32.44 | 90.59% | 9.0 | 3.37 |
| 8 | 0.75" | 2 | 200 | 35.81 | 31.52 | 88.02% | 11.0 | 4.29 |
| 8 | 0.75" | 3 | 200 | 35.81 | 32.09 | 89.62% | 10.0 | 3.72 |
| 8 | 0.75" | 4 | 200 | 35.81 | 31.47 | 87.89% | 11.0 | 4.34 |
| 8 | 0.75" | 5 | 200 | 35.81 | 31.12 | 86.90% | 12.0 | 4.69 |
| AVERAGE | | | | | 31.73 | 88.60% | 10.60 | 4.08 |

TABLE 22

12-Small Fingers with 0.75-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 12 | 0.75" | 1 | 200 | 35.81 | 31.93 | 89.16% | 10.0 | 3.88 |
| 12 | 0.75" | 2 | 200 | 35.81 | 32.46 | 90.65% | 9.0 | 3.35 |
| 12 | 0.75" | 3 | 200 | 35.81 | 31.80 | 88.79% | 11.0 | 4.01 |
| 12 | 0.75" | 4 | 200 | 35.81 | 32.33 | 90.28% | 9.0 | 3.48 |
| 12 | 0.75" | 5 | 200 | 35.81 | 31.87 | 88.99% | 10.0 | 3.94 |
| AVERAGE | | | | | 32.08 | 89.57% | 9.80 | 3.73 |

TABLE 23

16-Small Fingers with 0.75-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 16 | 0.75" | 1 | 200 | 35.81 | 32.33 | 90.29% | 9.0 | 3.48 |
| 16 | 0.75" | 2 | 200 | 35.81 | 32.69 | 91.28% | 8.0 | 3.12 |
| 16 | 0.75" | 3 | 200 | 35.81 | 32.07 | 89.55% | 10.0 | 3.74 |
| 16 | 0.75" | 4 | 200 | 35.81 | 32.25 | 90.05% | 9.0 | 3.56 |
| 16 | 0.75" | 5 | 200 | 35.81 | 32.27 | 90.13% | 9.0 | 3.54 |
| AVERAGE | | | | | 32.32 | 90.26% | 9.00 | 3.49 |

TABLE 24

4-Large Fingers with 1.5-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 4 | 1.50" | 1 | 200 | 35.81 | 32.05 | 89.51% | 9.0 | 3.76 |
| 4 | 1.50" | 2 | 200 | 35.81 | 32.33 | 90.28% | 9.0 | 3.48 |
| 4 | 1.50" | 3 | 200 | 35.81 | 31.79 | 88.76% | 10.0 | 4.02 |
| 4 | 1.50" | 4 | 200 | 35.81 | 31.45 | 87.83% | 11.0 | 4.36 |
| 4 | 1.50" | 5 | 200 | 35.81 | 31.94 | 89.19% | 10.0 | 3.87 |
| AVERAGE | | | | | 31.91 | 89.11% | 9.80 | 3.90 |

TABLE 25

8-Large Fingers with 1.5-in Width or Thickness

| | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 8 | 1.50" | 1 | 200 | 35.81 | 33.13 | 92.51% | 7.0 | 2.68 |
| 8 | 1.50" | 2 | 200 | 35.81 | 32.71 | 91.33% | 8.0 | 3.10 |
| 8 | 1.50" | 3 | 200 | 35.81 | 33.54 | 93.65% | 6.0 | 2.27 |
| 8 | 1.50" | 4 | 200 | 35.81 | 33.08 | 92.38% | 7.0 | 2.73 |
| 8 | 1.50" | 5 | 200 | 35.81 | 32.65 | 91.19% | 8.0 | 3.16 |
| AVERAGE | | | | | 33.02 | 92.21% | 7.20 | 2.79 |

TABLE 26

12-Large Fingers with 1.5-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 12 | 1.50" | 1 | 200 | 35.81 | 34.67 | 96.83% | 3.0 | 1.14 |
| 12 | 1.50" | 2 | 200 | 35.81 | 34.23 | 95.59% | 4.0 | 1.58 |
| 12 | 1.50" | 3 | 200 | 35.81 | 33.83 | 94.48% | 5.0 | 1.98 |
| 12 | 1.50" | 4 | 200 | 35.81 | 34.65 | 96.76% | 3.0 | 1.16 |
| 12 | 1.50" | 5 | 200 | 35.81 | 34.63 | 96.70% | 3.0 | 1.18 |
| AVERAGE | | | | | 34.40 | 96.07% | 3.60 | 1.41 |

TABLE 27

16-Large Fingers with 1.5-in Width or Thickness

| # OF FINGERS | FINGER WIDTH | PASS # | PASS LENGTH (ft) | THEORETICAL GRAIN VOLUME (Bu) | EMPIRICAL GRAIN VOLUME | SEPARATION EFFICIENCY | GRAIN LOSS (1 SQ FT) | GRAIN LOSS PER ACRE (Bu) |
|---|---|---|---|---|---|---|---|---|
| 16 | 1.50" | 1 | 200 | 35.81 | 34.65 | 96.75% | 3.0 | 1.16 |
| 16 | 1.50" | 2 | 200 | 35.81 | 35.02 | 97.81% | 2.0 | 0.79 |
| 16 | 1.50" | 3 | 200 | 35.81 | 34.66 | 96.79% | 3.0 | 1.15 |
| 16 | 1.50" | 4 | 200 | 35.81 | 34.64 | 96.72% | 3.0 | 1.17 |
| 16 | 1.50" | 5 | 200 | 35.81 | 35.02 | 97.81% | 2.0 | 0.79 |
| AVERAGE | | | | | 34.80 | 97.18% | 2.60 | 1.01 |

TABLE 28

Control Grate Ra and Root Mean Square (RMS) Calculations (each row representing a row of bracket members having fingers on the concave separator)

| CONTROL GRATE - (143) 0.25" FINGERS | | | | | | | | | | | | Ra | RMS |
|---|---|---|---|---|---|---|---|---|---|---|---|---|---|
| Row 1 | 0.25 | 0.25 | 0.25 | 0.25 | 0.25 | 0.25 | 0.25 | 0.25 | 0.25 | 0.25 | 0.25 | 0.2500 | 0.2750 |
| Row 2 | 0.25 | 0.25 | 0.25 | 0.25 | 0.25 | 0.25 | 0.25 | 0.25 | 0.25 | 0.25 | 0.25 | 0.2500 | 0.2750 |
| Row 3 | 0.25 | 0.25 | 0.25 | 0.25 | 0.25 | 0.25 | 0.25 | 0.25 | 0.25 | 0.25 | 0.25 | 0.2500 | 0.2750 |
| Row 4 | 0.25 | 0.25 | 0.25 | 0.25 | 0.25 | 0.25 | 0.25 | 0.25 | 0.25 | 0.25 | 0.25 | 0.2500 | 0.2750 |
| Row 5 | 0.25 | 0.25 | 0.25 | 0.25 | 0.25 | 0.25 | 0.25 | 0.25 | 0.25 | 0.25 | 0.25 | 0.2500 | 0.2750 |
| Row 6 | 0.25 | 0.25 | 0.25 | 0.25 | 0.25 | 0.25 | 0.25 | 0.25 | 0.25 | 0.25 | 0.25 | 0.2500 | 0.2750 |
| Row 7 | 0.25 | 0.25 | 0.25 | 0.25 | 0.25 | 0.25 | 0.25 | 0.25 | 0.25 | 0.25 | 0.25 | 0.2500 | 0.2750 |
| Row 8 | 0.25 | 0.25 | 0.25 | 0.25 | 0.25 | 0.25 | 0.25 | 0.25 | 0.25 | 0.25 | 0.25 | 0.2500 | 0.2750 |
| Row 9 | 0.25 | 0.25 | 0.25 | 0.25 | 0.25 | 0.25 | 0.25 | 0.25 | 0.25 | 0.25 | 0.25 | 0.2500 | 0.2750 |
| Row 10 | 0.25 | 0.25 | 0.25 | 0.25 | 0.25 | 0.25 | 0.25 | 0.25 | 0.25 | 0.25 | 0.25 | 0.2500 | 0.2750 |
| Row 11 | 0.25 | 0.25 | 0.25 | 0.25 | 0.25 | 0.25 | 0.25 | 0.25 | 0.25 | 0.25 | 0.25 | 0.2500 | 0.2750 |
| Row 12 | 0.25 | 0.25 | 0.25 | 0.25 | 0.25 | 0.25 | 0.25 | 0.25 | 0.25 | 0.25 | 0.25 | 0.2500 | 0.2750 |
| Row 13 | 0.25 | 0.25 | 0.25 | 0.25 | 0.25 | 0.25 | 0.25 | 0.25 | 0.25 | 0.25 | 0.25 | 0.2500 | 0.2750 |
| | | | | | | | | | | | AVG | 0.2500 | 0.2750 |

TABLE 29

Ra and Root Mean Square (RMS) Performance Calculations of the Small and Large Finger Configurations (each row representing a row of bracket members having fingers on the concave separator)

| BEST PERFORMING PROTOTYPE GRATE - (16) 1.50" FINGER | | | | | | | | | | | | Ra | RMS |
|---|---|---|---|---|---|---|---|---|---|---|---|---|---|
| Row 1 | 1.50 | 0.25 | 0.25 | 1.50 | 0.25 | 0.25 | 0.25 | 1.50 | 0.25 | 0.25 | 1.50 | 0.7045 | 0.7750 |
| Row 2 | 1.50 | 0.25 | 0.25 | 1.50 | 0.25 | 0.25 | 0.25 | 1.50 | 0.25 | 0.25 | 1.50 | 0.7045 | 0.7750 |
| Row 3 | 1.50 | 0.25 | 0.25 | 1.50 | 0.25 | 0.25 | 0.25 | 1.50 | 0.25 | 0.25 | 1.50 | 0.7045 | 0.7750 |
| Row 4 | 1.50 | 0.25 | 0.25 | 1.50 | 0.25 | 0.25 | 0.25 | 1.50 | 0.25 | 0.25 | 1.50 | 0.7045 | 0.7750 |
| Row 5 | 0.25 | 0.25 | 0.25 | 0.25 | 0.25 | 0.25 | 0.25 | 0.25 | 0.25 | 0.25 | 0.25 | 0.2500 | 0.2750 |
| Row 6 | 0.25 | 0.25 | 0.25 | 0.25 | 0.25 | 0.25 | 0.25 | 0.25 | 0.25 | 0.25 | 0.25 | 0.2500 | 0.2750 |
| Row 7 | 0.25 | 0.25 | 0.25 | 0.25 | 0.25 | 0.25 | 0.25 | 0.25 | 0.25 | 0.25 | 0.25 | 0.2500 | 0.2750 |
| Row 8 | 0.25 | 0.25 | 0.25 | 0.25 | 0.25 | 0.25 | 0.25 | 0.25 | 0.25 | 0.25 | 0.25 | 0.2500 | 0.2750 |
| Row 9 | 0.25 | 0.25 | 0.25 | 0.25 | 0.25 | 0.25 | 0.25 | 0.25 | 0.25 | 0.25 | 0.25 | 0.2500 | 0.2750 |
| Row 10 | 0.25 | 0.25 | 0.25 | 0.25 | 0.25 | 0.25 | 0.25 | 0.25 | 0.25 | 0.25 | 0.25 | 0.2500 | 0.2750 |
| Row 11 | 0.25 | 0.25 | 0.25 | 0.25 | 0.25 | 0.25 | 0.25 | 0.25 | 0.25 | 0.25 | 0.25 | 0.2500 | 0.2750 |
| Row 12 | 0.25 | 0.25 | 0.25 | 0.25 | 0.25 | 0.25 | 0.25 | 0.25 | 0.25 | 0.25 | 0.25 | 0.2500 | 0.2750 |
| Row 13 | 0.25 | 0.25 | 0.25 | 0.25 | 0.25 | 0.25 | 0.25 | 0.25 | 0.25 | 0.25 | 0.25 | 0.2500 | 0.2750 |
| | | | | | | | | | | | AVG | 0.3899 | 0.4288 |

TABLE 30

Summary of Results for the Control, Small, and Large Finger Configurations

| | # OF CONTROL FINGERS (0.25") | # OF TEST FINGERS | TEST FINGER WIDTH | ROUGHNESS (Ra) | ROUGHNESS (RMS) | SEPARATION EFFICIENCY |
|---|---|---|---|---|---|---|
| Control | 143 | 0 | — | 0.2500 | 0.2750 | 87.4% |
| | 139 | 4 | 0.75" | 0.2640 | 0.2904 | 88.0% |
| | 131 | 8 | 0.75" | 0.2780 | 0.3058 | 88.6% |
| | 119 | 12 | 0.75" | 0.2920 | 0.3212 | 89.6% |
| | 103 | 16 | 0.75" | 0.3059 | 0.3365 | 90.3% |
| | 99 | 4 | 1.50" | 0.2850 | 0.3135 | 89.1% |
| | 91 | 8 | 1.50" | 0.3199 | 0.3519 | 92.2% |
| | 79 | 12 | 1.50" | 0.3549 | 0.3904 | 96.1% |
| Best Performing | 63 | 16 | 1.50" | 0.3899 | 0.4289 | 97.2% |
| Ideal | | | | | | 100.00% |

As shown in the summary of results of TABLE 30, a bracket member 310 having a row of 16 large finger protrusions 332 or 334 having approximate 1.5-in width or thickness, either with or without serrated edges, respectively, provided the most optimal and efficient separation of the test crop. Specifically, based on the number of fingers per bracket member, finger width, surface roughness average (Ra) of the fingers (measured as surface peaks and valleys), and a Root Mean Square (RMS) calculation of the surface roughness, the most optimal separation efficiency was calculated to be the 16 large finger configurations of the disclosure described herein having a 97.2% efficiency rate, either in serrated or smooth non-serrated configurations. More significantly, all of the aforementioned configurations of the disclosure described herein had a markedly improved efficiency rate over conventional or standard concave separation grates in the art, such as grates having fingers with an approximately 0.25 in. width or thickness fingers.

What is claimed is:

1. An apparatus for threshing grain in a concave, comprising:
- an elongated bar comprising a semi-cylindrical or partially round configuration;
- the elongated bar further comprising a partial cut-out, notch, or channel longitudinally extending the length of the elongated bar, wherein the partial cut-out, notch, or channel is comprised of a sloped straight first surface and a flat second surface, wherein the slope of the first surface is within a range of about 20 degrees to about 65 degrees; and
- wherein the elongated bar is secured to the concave.

2. The apparatus of claim 1, wherein the first surface is configured to make contact with one or more grains of a crop material, thereby separating the one or more grains from the crop material.

3. The apparatus of claim 1, wherein the slope of the first surface comprises an about 20 degree angle.

4. The apparatus of claim 1, wherein the slope of the first surface comprises an about 25 degree angle.

5. The apparatus of claim 1, wherein the slope of the first surface comprises an about 30 degree angle.

6. The apparatus of claim 1, wherein the slope of the first surface comprises an about 35 degree angle.

7. The apparatus of claim 1, wherein the slope of the first surface comprises an about 40 degree angle.

8. The apparatus of claim 1, wherein the slope of the first surface comprises an about 45 degree angle.

9. The apparatus of claim 1, wherein the slope of the first surface comprises an about 50 degree angle.

10. The apparatus of claim 1, wherein the slope of the first surface comprises an about 65 degree angle.

11. The apparatus of claim 1, wherein the slope of the first surface comprises an about 55 degree or 60 degree angle.

12. The apparatus of claim 1, further comprising a sloped third surface, wherein the slope of the first surface is at an angle that is more or less than the slope of the third surface.

13. The apparatus of claim 12, wherein the slope of the first surface is comprised of an about 30 degree angle, and the slope of the third surface is comprised of an about 45 degree angle.

14. An apparatus for threshing grain in a concave, comprising:
- an elongated bar secured to the concave, wherein the elongated bar is comprised of a semi-cylindrical or partially round configuration;
- the elongated bar comprising a partial cut-out, notch, or channel longitudinally extending the length of the elongated bar;
- wherein the partial cut-out, notch, or channel comprises a first raised linear surface and a second linear surface configured to make contact with one or more grains of a crop material; and
- wherein the second surface is axially aligned along a horizontal plane and the first raised surface is at an angle within a range of about 20 degrees to about 65 degrees relative to the horizontal plane.

15. The apparatus of claim 14, wherein the first raised surface is at an angle of about 20 degrees relative to the horizontal plane.

16. The apparatus of claim 14, wherein the first raised surface is at an angle of about 25 degrees relative to the horizontal plane.

17. The apparatus of claim 14, wherein the first raised surface is at an angle of about 30 degrees relative to the horizontal plane.

18. The apparatus of claim 14, wherein the first raised surface is at an angle of about 35 degrees relative to the horizontal plane.

19. The apparatus of claim 14, wherein the first raised surface is at an angle of about 40 degrees relative to the horizontal plane.

20. The apparatus of claim 14, wherein the first raised surface is at an angle of about 45 degrees relative to the horizontal plane.

21. The apparatus of claim 14, wherein the first raised surface is at an angle of about 50 degrees relative to the horizontal plane.

22. The apparatus of claim 14, wherein the first raised surface is at an angle of about 55 degrees relative to the horizontal plane.

23. The apparatus of claim 14, wherein the first raised surface is at an angle of about 60 degrees relative to the horizontal plane.

24. The apparatus of claim 14, wherein the first raised surface is at an angle of about 65 degrees relative to the horizontal plane.

25. An apparatus for threshing crop in a concave, comprising:
- a plurality of elongated bars secured to the concave, wherein each of the elongated bars comprise a semi-cylindrical or partially round configuration; and
- each of the elongated bars comprising a cut-out, notch, or channel; extending along the lenght of each of the elongated bars, wherein the partial cut-out, notch, or channel is comprised of a sloped straight first surface and a flat second surface, and wherein the slope of the first surface is within a range of approximately 20 degrees to approximately 65 degrees.

* * * * *